US010380232B2

(12) United States Patent
Vagell et al.

(10) Patent No.: US 10,380,232 B2
(45) Date of Patent: Aug. 13, 2019

(54) SYSTEMS AND METHODS FOR RESOLVING PRIVILEGED EDITS WITHIN SUGGESTED EDITS

(71) Applicant: Google LLC, Mountain View, CA (US)

(72) Inventors: Vance Julius Vagell, Kew Gardens, NY (US); Fil Zembowicz, New York, NY (US); Luiz Amaral Franca Pereira Filho, Jersey City, NJ (US); Ian Gunn, San Francisco, CA (US); Nikita Rybak, Sydney (AU)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/979,411

(22) Filed: May 14, 2018

(65) Prior Publication Data

US 2018/0260368 A1 Sep. 13, 2018

Related U.S. Application Data

(63) Continuation of application No. 13/970,090, filed on Aug. 19, 2013, now Pat. No. 9,971,752.

(51) Int. Cl.
*G06F 17/24* (2006.01)
*G06F 16/176* (2019.01)
*G06F 17/22* (2006.01)

(52) U.S. Cl.
CPC ............ *G06F 17/24* (2013.01); *G06F 16/176* (2019.01); *G06F 17/2288* (2013.01)

(58) Field of Classification Search
CPC .................. G06F 17/2288; G06F 17/24; G06F 17/30165; G06F 16/167
See application file for complete search history.

(56) References Cited

U.S. PATENT DOCUMENTS 4,889,439 A 12/1989 Cook et al.
5,111,397 A 5/1992 Chirokas et al.
(Continued)

FOREIGN PATENT DOCUMENTS

KR 2010-0137323 A 12/2010
KR 2012-001 0397 2/2012

OTHER PUBLICATIONS

The Student Multimedia Studio, "Setting Sharing Permissions for Google Docs and Google Sites", Sep. 4, 2010, Kent State University, https://www.library.kent.edu/files/SMS_Google_Sharing_Permissions.pdf, pp. 9 (Year: 2010).*
(Continued)

*Primary Examiner* — Chau T Nguyen
(74) *Attorney, Agent, or Firm* — Lowenstein Sandler LLP

(57) ABSTRACT

Systems and methods are disclosed herein to present an incorporation of a second edit into a first edit in an electronic document. A method includes present the first edit and the second edit in the electronic document, the first edit and the second edit representing concurrent updates to the electronic document by multiple users comprising a first user and a second user and having different privilege levels, the first edit and the second edit having a shared position in the electronic document. The method also includes present one or more first graphical elements allowing the second user to select to accept or reject the first edit made by the first user, and present, based on respective privilege levels, the shared position and a selection of the second user to accept or reject the first edit made by the first user, the incorporation of the second edit into the first edit, and a second graphical element allowing the second user to view a plurality of display options for the electronic document with the second edit incorporated into the first edit. The method further includes present the plurality of display options allowing the second user to select one or more of a plurality of edits to the
(Continued)

electronic document by the plurality of users, and one or more a plurality of types of edits by the plurality of users, the plurality of display options further allowing the second user to accept or reject selected one or more edits or selected one or more types of edits.

20 Claims, 12 Drawing Sheets

(56) References Cited

U.S. PATENT DOCUMENTS

| | | | |
|---|---|---|---|
| 5,142,674 | A | 8/1992 | Barker et al. |
| 5,146,552 | A | 9/1992 | Cassorla et al. |
| 5,231,577 | A | 7/1993 | Koss |
| 5,381,523 | A | 1/1995 | Hayashi |
| 5,408,470 | A | 4/1995 | Rothrock et al. |
| 5,557,722 | A | 9/1996 | DeRose et al. |
| 5,600,775 | A | 2/1997 | King et al. |
| 5,675,788 | A | 10/1997 | Husick et al. |
| 5,694,609 | A | 12/1997 | Murata |
| 5,708,826 | A | 1/1998 | Ikeda et al. |
| 5,758,358 | A | 5/1998 | Ebbo |
| 5,761,669 | A | 6/1998 | Montague et al. |
| 5,793,966 | A | 8/1998 | Amstein et al. |
| 5,799,325 | A | 8/1998 | Rivette et al. |
| 5,819,304 | A | 10/1998 | Nilsen et al. |
| 5,860,073 | A | 1/1999 | Ferrel et al. |
| 5,890,177 | A | 3/1999 | Moody et al. |
| 5,895,476 | A | 4/1999 | Orr et al. |
| 6,025,836 | A | 2/2000 | McBride |
| 6,049,664 | A | 4/2000 | Dale et al. |
| 6,061,697 | A | 5/2000 | Nakao |
| 6,065,026 | A | 5/2000 | Cornelia et al. |
| 6,067,551 | A | 5/2000 | Brown et al. |
| 6,073,144 | A | 6/2000 | van Hoff |
| 6,169,999 | B1 | 1/2001 | Kanno |
| 6,173,317 | B1 | 1/2001 | Chaddha et al. |
| 6,212,549 | B1 | 4/2001 | Page et al. |
| 6,243,706 | B1 | 6/2001 | Moreau et al. |
| 6,327,584 | B1 | 12/2001 | Xian et al. |
| 6,341,305 | B2 | 1/2002 | Wolfe |
| 6,349,308 | B1 | 2/2002 | Whang et al. |
| 6,349,314 | B1 | 2/2002 | Patel |
| 6,377,957 | B1 | 4/2002 | Jeyaraman |
| 6,377,993 | B1 | 4/2002 | Brandt et al. |
| 6,418,441 | B1 | 7/2002 | Call |
| 6,438,564 | B1 | 8/2002 | Morton et al. |
| 6,501,779 | B1 | 12/2002 | McLaughlin et al. |
| 6,532,218 | B1 | 3/2003 | Shaffer et al. |
| 6,551,357 | B1 | 4/2003 | Madduri |
| 6,584,479 | B2 | 6/2003 | Chang et al. |
| 6,662,210 | B1 | 12/2003 | Carleton et al. |
| 6,665,835 | B1 | 12/2003 | Gutfreund et al. |
| 6,687,878 | B1 | 2/2004 | Eintracht et al. |
| 6,697,569 | B1 | 2/2004 | Gomez et al. |
| 6,717,593 | B1 | 4/2004 | Jennings |
| 6,728,753 | B1 | 4/2004 | Parasnis et al. |
| 6,731,309 | B1 | 5/2004 | Unbedacht et al. |
| 6,760,749 | B1 | 7/2004 | Dunlap et al. |
| 6,766,333 | B1 | 7/2004 | Wu et al. |
| 6,771,291 | B1 | 8/2004 | DiStefano, III |
| 6,865,713 | B1 | 3/2005 | Bates et al. |
| 6,879,997 | B1 | 4/2005 | Ketola et al. |
| 6,904,561 | B1 | 6/2005 | Faraday et al. |
| 6,912,726 | B1 | 6/2005 | Chen et al. |
| 6,983,416 | B1 | 1/2006 | Bae et al. |
| 6,988,241 | B1 | 1/2006 | Guttman et al. |
| 7,017,112 | B2 | 3/2006 | Collie et al. |
| 7,031,954 | B1 | 4/2006 | Kirsch |
| 7,035,910 | B1 | 4/2006 | Dutta et al. |
| 7,039,643 | B2 | 5/2006 | Sena et al. |
| 7,069,502 | B2 | 6/2006 | Numata et al. |
| 7,106,469 | B2 | 9/2006 | Simpson et al. |
| 7,143,177 | B1 | 11/2006 | Johnson et al. |
| 7,149,957 | B2 | 12/2006 | Hull et al. |
| 7,149,973 | B2 | 12/2006 | Dias et al. |
| 7,162,693 | B2 | 1/2007 | Yamanaka et al. |
| 7,197,510 | B2 | 3/2007 | Abe et al. |
| 7,206,773 | B2 | 4/2007 | Erol et al. |
| 7,213,199 | B2 | 5/2007 | Humenansky et al. |
| 7,233,951 | B1 | 6/2007 | Gainer et al. |
| 7,263,497 | B1 | 8/2007 | Wiser et al. |
| 7,263,688 | B2 | 8/2007 | Pitzel et al. |
| 7,266,568 | B1 | 9/2007 | Erol et al. |
| 7,284,199 | B2 | 10/2007 | Parasnis et al. |
| 7,287,094 | B2 | 10/2007 | Mogul |
| 7,299,404 | B2 | 11/2007 | Agarwal et al. |
| 7,305,613 | B2 | 12/2007 | Oezgen |
| 7,325,187 | B2 | 1/2008 | Yashiro |
| 7,330,875 | B1 | 2/2008 | Parasnis et al. |
| 7,350,142 | B2 | 3/2008 | Kraft et al. |
| 7,409,633 | B2 | 8/2008 | Lerner et al. |
| 7,418,656 | B1 | 8/2008 | Petersen |
| 7,424,670 | B2 | 9/2008 | Burke et al. |
| 7,432,938 | B1 | 10/2008 | Reuter et al. |
| 7,437,421 | B2 | 10/2008 | Bhogal et al. |
| 7,478,330 | B1 | 1/2009 | Branson et al. |
| 7,487,448 | B2 | 2/2009 | Emerson et al. |
| 7,491,399 | B2 | 2/2009 | Vakharia |
| 7,506,242 | B2 | 3/2009 | Kotler et al. |
| 7,529,778 | B1 | 5/2009 | Dewey et al. |
| 7,559,017 | B2 | 7/2009 | Datar et al. |
| 7,634,728 | B2 | 12/2009 | Kraft |
| 7,656,543 | B2 | 2/2010 | Atkins |
| 7,667,862 | B2 | 2/2010 | Ziegler et al. |
| 7,680,932 | B2 | 3/2010 | Defaix et al. |
| 7,698,379 | B2 | 4/2010 | Dutta et al. |
| 7,707,413 | B2 | 4/2010 | Lunt et al. |
| 7,711,835 | B2 | 5/2010 | Braddy et al. |
| 7,712,016 | B2 | 5/2010 | Jones et al. |
| 7,734,914 | B1 | 6/2010 | Malasky |
| 7,735,101 | B2 | 6/2010 | Lanza et al. |
| 7,739,255 | B2 | 6/2010 | Hengel et al. |
| 7,743,331 | B1 | 6/2010 | Fleischer et al. |
| 7,761,796 | B2 | 7/2010 | Faraday et al. |
| 7,769,810 | B1 | 8/2010 | Kaufman |
| 7,774,703 | B2 | 8/2010 | Junuzovic et al. |
| 7,779,113 | B1 | 8/2010 | Samar |
| 7,779,347 | B2 | 8/2010 | Christiansen et al. |
| 7,792,788 | B2 | 9/2010 | Melmon et al. |
| 7,818,678 | B2 | 10/2010 | Massand |
| 7,818,679 | B2 | 10/2010 | Clarke |
| 7,823,058 | B2 | 10/2010 | Pea et al. |
| 7,836,148 | B2 | 11/2010 | Popp et al. |
| 7,849,401 | B2 | 12/2010 | Elza et al. |
| 7,865,816 | B2 | 1/2011 | Tanaka |
| 7,890,405 | B1 | 2/2011 | Robb |
| 7,890,928 | B2 | 2/2011 | Patrudu |
| 7,920,894 | B2 | 4/2011 | Wyler |
| 7,937,663 | B2 | 5/2011 | Parker |
| 7,941,399 | B2 | 5/2011 | Bailor et al. |
| 7,941,419 | B2 | 5/2011 | Bhatkar et al. |
| 7,941,444 | B2 | 5/2011 | Cragun et al. |
| 7,962,853 | B2 | 6/2011 | Bedi et al. |
| 7,966,556 | B1 | 6/2011 | Bourdev |
| 7,975,223 | B2 | 7/2011 | Plumley et al. |
| 7,982,747 | B1 | 7/2011 | Dulaney et al. |
| 7,986,298 | B1 | 7/2011 | Dulaney et al. |
| 7,996,380 | B2 | 8/2011 | Arrouye et al. |
| 7,996,446 | B2 | 8/2011 | Bacon et al. |
| 8,015,496 | B1 | 9/2011 | Rogers |
| 8,019,780 | B1 | 9/2011 | Pinkerton et al. |
| 8,073,812 | B2 | 12/2011 | Curtis |
| 8,086,960 | B1* | 12/2011 | Gopalakrishna ............ G06F 17/30896 715/234 |
| 8,108,427 | B2 | 1/2012 | Prahlad et al. |
| 8,116,569 | B2 | 2/2012 | Markiewicz et al. |
| 8,131,723 | B2 | 3/2012 | Sim-Tang |
| 8,151,204 | B2 | 4/2012 | Lusen et al. |
| 8,184,811 | B1 | 5/2012 | Patten et al. |
| 8,190,987 | B2 | 5/2012 | Campbell et al. |
| 8,225,274 | B2 | 7/2012 | Cowtan |

(56) References Cited

U.S. PATENT DOCUMENTS

| | | |
|---|---|---|
| 8,250,455 B2 | 8/2012 | Kadowaki et al. |
| 8,266,534 B2 | 9/2012 | Curtis et al. |
| 8,275,974 B2 | 9/2012 | Voshell |
| 8,281,023 B2 | 10/2012 | Dondeti et al. |
| 8,296,647 B1 | 10/2012 | Bourdev |
| 8,327,127 B2 | 12/2012 | Suryanarayana et al. |
| 8,332,815 B2 | 12/2012 | Balfe et al. |
| 8,341,708 B1 | 12/2012 | Eatough et al. |
| 8,352,870 B2 | 1/2013 | Bailor et al. |
| 8,384,759 B2 | 2/2013 | Hagen et al. |
| 8,386,478 B2 | 2/2013 | Wang |
| 8,417,666 B2 | 4/2013 | Bailor et al. |
| 8,418,051 B1 | 4/2013 | Bourdev |
| 8,429,528 B2 | 4/2013 | March, Jr. |
| 8,453,052 B1 | 5/2013 | Newman et al. |
| 8,478,817 B2 | 7/2013 | Duggal |
| 8,682,989 B2 | 3/2014 | Meisels et al. |
| 8,700,986 B1 | 4/2014 | Pereira et al. |
| 8,943,399 B1 | 1/2015 | Pereira et al. |
| 2001/0037346 A1 | 11/2001 | Johnson |
| 2002/0032701 A1 | 3/2002 | Gao et al. |
| 2002/0035580 A1 | 3/2002 | Tanabe |
| 2002/0051185 A1 | 5/2002 | Yamaguchi et al. |
| 2002/0065848 A1 | 5/2002 | Walker et al. |
| 2002/0133492 A1 | 9/2002 | Goldstein et al. |
| 2002/0143691 A1 | 10/2002 | Ramaley et al. |
| 2002/0161797 A1 | 10/2002 | Gallo et al. |
| 2002/0162118 A1 | 10/2002 | Levy et al. |
| 2002/0194302 A1 | 12/2002 | Blumberg |
| 2003/0014406 A1 | 1/2003 | Faieta et al. |
| 2003/0037076 A1 | 2/2003 | Bravery et al. |
| 2003/0037303 A1 | 2/2003 | Bodlaender et al. |
| 2003/0061280 A1 | 3/2003 | Bulson et al. |
| 2003/0084078 A1 | 5/2003 | Torii et al. |
| 2003/0105719 A1 | 6/2003 | Berger et al. |
| 2003/0126592 A1 | 7/2003 | Mishra et al. |
| 2003/0145279 A1 | 7/2003 | Bourbakis et al. |
| 2003/0222890 A1 | 12/2003 | Salesin et al. |
| 2004/0019595 A1 | 1/2004 | Bhogal et al. |
| 2004/0044965 A1 | 3/2004 | Toyama et al. |
| 2004/0085354 A1 | 5/2004 | Massand |
| 2004/0088653 A1 | 5/2004 | Bell et al. |
| 2004/0113141 A1 | 6/2004 | Isuda et al. |
| 2004/0133444 A1 | 7/2004 | Defaix et al. |
| 2004/0133639 A1 | 7/2004 | Shuang et al. |
| 2004/0201633 A1 | 10/2004 | Barsness et al. |
| 2004/0205358 A1 | 10/2004 | Erickson |
| 2004/0205477 A1 | 10/2004 | Lin |
| 2004/0205653 A1* | 10/2004 | Hadfield .......... G06Q 10/10 715/255 |
| 2004/0210833 A1 | 10/2004 | Lerner et al. |
| 2004/0215672 A1 | 10/2004 | Pfitzner |
| 2004/0215825 A1 | 10/2004 | Pfitzner |
| 2004/0215826 A1 | 10/2004 | Pfitzner |
| 2004/0216090 A1 | 10/2004 | Kaler et al. |
| 2004/0248612 A1 | 12/2004 | Lee et al. |
| 2004/0255005 A1 | 12/2004 | Spooner |
| 2004/0255337 A1 | 12/2004 | Doyle et al. |
| 2004/0260594 A1 | 12/2004 | Maddox, Jr. |
| 2004/0260714 A1 | 12/2004 | Chatterjee et al. |
| 2005/0055337 A1 | 3/2005 | Bebo et al. |
| 2005/0091291 A1 | 4/2005 | Kaler et al. |
| 2005/0125461 A1 | 6/2005 | Filz |
| 2005/0131887 A1 | 6/2005 | Rohrabaugh et al. |
| 2005/0144256 A1 | 6/2005 | Blumberg |
| 2005/0160355 A1 | 7/2005 | Cragun et al. |
| 2005/0160356 A1 | 7/2005 | Albornoz et al. |
| 2005/0160357 A1 | 7/2005 | Rivette et al. |
| 2005/0160368 A1 | 7/2005 | Liu et al. |
| 2005/0182650 A1 | 8/2005 | Maddox, Jr. et al. |
| 2005/0185636 A1 | 8/2005 | Bucher |
| 2005/0200896 A1 | 9/2005 | Narusawa et al. |
| 2005/0223315 A1 | 10/2005 | Shimizu et al. |
| 2005/0234943 A1 | 10/2005 | Clarke |
| 2005/0243760 A1 | 11/2005 | Yoshioka |
| 2005/0268220 A1 | 12/2005 | Tanaka |
| 2005/0273695 A1 | 12/2005 | Schnurr |
| 2005/0289538 A1 | 12/2005 | Black-Ziegelbein et al. |
| 2006/0005168 A1 | 1/2006 | Singh |
| 2006/0031751 A1 | 2/2006 | Ehud |
| 2006/0053194 A1 | 3/2006 | Schneider et al. |
| 2006/0053365 A1 | 3/2006 | Hollander et al. |
| 2006/0070029 A1 | 3/2006 | Laborczfalvi et al. |
| 2006/0075332 A1 | 4/2006 | Fairweather et al. |
| 2006/0080601 A1 | 4/2006 | Weber et al. |
| 2006/0101071 A1 | 5/2006 | Henderson |
| 2006/0101328 A1 | 5/2006 | Albornoz et al. |
| 2006/0123329 A1 | 6/2006 | Steen et al. |
| 2006/0123348 A1 | 6/2006 | Ross et al. |
| 2006/0149795 A1 | 7/2006 | Gillespie et al. |
| 2006/0149831 A1 | 7/2006 | Dutta et al. |
| 2006/0161841 A1 | 7/2006 | Horiuchi et al. |
| 2006/0200755 A1 | 9/2006 | Melmon et al. |
| 2006/0224570 A1 | 10/2006 | Quiroga et al. |
| 2006/0230344 A1 | 10/2006 | Jennings et al. |
| 2006/0248121 A1 | 11/2006 | Cacenco et al. |
| 2006/0282762 A1 | 12/2006 | Diamond et al. |
| 2006/0282778 A1 | 12/2006 | Barsness et al. |
| 2007/0003223 A1 | 1/2007 | Armstrong et al. |
| 2007/0033654 A1 | 2/2007 | Wilson |
| 2007/0047008 A1 | 3/2007 | Graham et al. |
| 2007/0055926 A1 | 3/2007 | Christiansen et al. |
| 2007/0061714 A1 | 3/2007 | Stuple et al. |
| 2007/0067182 A1 | 3/2007 | Harp et al. |
| 2007/0070066 A1 | 3/2007 | Bakhash |
| 2007/0073899 A1 | 3/2007 | Judge et al. |
| 2007/0100938 A1 | 5/2007 | Bagley et al. |
| 2007/0118598 A1 | 5/2007 | Bedi et al. |
| 2007/0118794 A1 | 5/2007 | Hollander et al. |
| 2007/0118795 A1 | 5/2007 | Noyes et al. |
| 2007/0174762 A1 | 7/2007 | Plant |
| 2007/0186157 A1 | 8/2007 | Walker et al. |
| 2007/0208992 A1 | 9/2007 | Koren |
| 2007/0220068 A1 | 9/2007 | Thompson et al. |
| 2007/0239695 A1 | 10/2007 | Chakra et al. |
| 2007/0244906 A1 | 10/2007 | Colton et al. |
| 2007/0250901 A1 | 10/2007 | McIntire et al. |
| 2007/0254631 A1 | 11/2007 | Spooner |
| 2007/0260677 A1 | 11/2007 | DeMarco et al. |
| 2007/0260996 A1 | 11/2007 | Jakobson |
| 2007/0266325 A1 | 11/2007 | Helm et al. |
| 2007/0271502 A1 | 11/2007 | Bedi et al. |
| 2007/0288637 A1 | 12/2007 | Layton et al. |
| 2008/0028302 A1 | 1/2008 | Meschkat |
| 2008/0034275 A1 | 2/2008 | Edd et al. |
| 2008/0040659 A1 | 2/2008 | Doyle |
| 2008/0046837 A1 | 2/2008 | Beauchamp et al. |
| 2008/0059417 A1 | 3/2008 | Yamada et al. |
| 2008/0059539 A1 | 3/2008 | Chin et al. |
| 2008/0071827 A1 | 3/2008 | Hengel et al. |
| 2008/0082604 A1 | 4/2008 | Mansour et al. |
| 2008/0092066 A1 | 4/2008 | Edlund et al. |
| 2008/0126943 A1 | 5/2008 | Parasnis et al. |
| 2008/0127212 A1 | 5/2008 | Nakamizo et al. |
| 2008/0168073 A1 | 7/2008 | Siegel et al. |
| 2008/0172720 A1 | 7/2008 | Botz et al. |
| 2008/0189361 A1 | 8/2008 | Greschler et al. |
| 2008/0222273 A1 | 9/2008 | Lakshmanan et al. |
| 2008/0229181 A1 | 9/2008 | Jung et al. |
| 2008/0244374 A1 | 10/2008 | Hattori |
| 2008/0263101 A1 | 10/2008 | Hara |
| 2008/0263442 A1 | 10/2008 | Plumley et al. |
| 2008/0270406 A1 | 10/2008 | Flavin et al. |
| 2008/0282143 A1 | 11/2008 | Hiyama et al. |
| 2008/0301571 A1 | 12/2008 | Herzog |
| 2009/0006842 A1 | 1/2009 | Ross et al. |
| 2009/0025063 A1 | 1/2009 | Thomas |
| 2009/0049046 A1 | 2/2009 | Godzik et al. |
| 2009/0055755 A1 | 2/2009 | Hicks et al. |
| 2009/0070128 A1 | 3/2009 | McCauley et al. |
| 2009/0083707 A1 | 3/2009 | Fujita et al. |
| 2009/0089664 A1 | 4/2009 | Wagner et al. |
| 2009/0094086 A1 | 4/2009 | Bruno et al. |
| 2009/0094329 A1 | 4/2009 | Ambati et al. |

(56) References Cited

U.S. PATENT DOCUMENTS

| | | |
|---|---|---|
| 2009/0094667 A1 | 4/2009 | Habeck et al. |
| 2009/0099919 A1 | 4/2009 | Schultheiss et al. |
| 2009/0112953 A1 | 4/2009 | Barsness et al. |
| 2009/0112990 A1 | 4/2009 | Campbell et al. |
| 2009/0119572 A1 | 5/2009 | Koivunen |
| 2009/0129596 A1 | 5/2009 | Chavez et al. |
| 2009/0132907 A1 | 5/2009 | Shao et al. |
| 2009/0144616 A1 | 6/2009 | Mori |
| 2009/0157490 A1 | 6/2009 | Lawyer |
| 2009/0157608 A1 | 6/2009 | Strathearn et al. |
| 2009/0157811 A1 | 6/2009 | Bailor et al. |
| 2009/0164620 A1 | 6/2009 | Ziegler et al. |
| 2009/0165128 A1 | 6/2009 | McNally et al. |
| 2009/0192845 A1 | 7/2009 | Gudipaty et al. |
| 2009/0199090 A1 | 8/2009 | Poston et al. |
| 2009/0210459 A1 | 8/2009 | Nair et al. |
| 2009/0210721 A1 | 8/2009 | Phillips |
| 2009/0235181 A1 | 9/2009 | Saliba et al. |
| 2009/0235352 A1 | 9/2009 | Schrijen et al. |
| 2009/0249224 A1* | 10/2009 | Davis ................... G06Q 10/10 715/753 |
| 2009/0254580 A1 | 10/2009 | Laurion |
| 2009/0254802 A1 | 10/2009 | Campagna et al. |
| 2009/0254840 A1 | 10/2009 | Churchill et al. |
| 2009/0271696 A1 | 10/2009 | Bailor et al. |
| 2009/0288135 A1 | 11/2009 | Chang et al. |
| 2009/0292548 A1 | 11/2009 | Van Court |
| 2009/0307585 A1 | 12/2009 | Tranchant et al. |
| 2010/0005398 A1 | 1/2010 | Pratley et al. |
| 2010/0005410 A1 | 1/2010 | Pang |
| 2010/0005529 A1 | 1/2010 | Hemade |
| 2010/0030578 A1 | 2/2010 | Siddique et al. |
| 2010/0031135 A1 | 2/2010 | Naghshin et al. |
| 2010/0050089 A1 | 2/2010 | Kim et al. |
| 2010/0070852 A1 | 3/2010 | Li |
| 2010/0077301 A1 | 3/2010 | Bodnick et al. |
| 2010/0083096 A1 | 4/2010 | Dupuis-Latour et al. |
| 2010/0137323 A1 | 6/2010 | Brown et al. |
| 2010/0161762 A1 | 6/2010 | Saxena |
| 2010/0174783 A1 | 7/2010 | Zarom |
| 2010/0199191 A1 | 8/2010 | Takahashi |
| 2010/0205230 A1 | 8/2010 | Simeonov et al. |
| 2010/0218099 A1 | 8/2010 | van Melle et al. |
| 2010/0235763 A1 | 9/2010 | Massand |
| 2010/0245256 A1 | 9/2010 | Estrada et al. |
| 2010/0251092 A1 | 9/2010 | Sun |
| 2010/0251122 A1 | 9/2010 | Lee et al. |
| 2010/0257457 A1 | 10/2010 | De Goes |
| 2010/0257578 A1 | 10/2010 | Shukla et al. |
| 2010/0262636 A1 | 10/2010 | Bacon et al. |
| 2010/0262659 A1 | 10/2010 | Christiansen et al. |
| 2010/0274910 A1 | 10/2010 | Ghanaie-Sichanie et al. |
| 2010/0278453 A1 | 11/2010 | King |
| 2010/0281076 A1 | 11/2010 | Pan et al. |
| 2010/0281528 A1 | 11/2010 | Hayton et al. |
| 2010/0309436 A1 | 12/2010 | Allen, Jr. et al. |
| 2010/0318894 A1 | 12/2010 | Billharz et al. |
| 2011/0018963 A1 | 1/2011 | Robinson |
| 2011/0035661 A1 | 2/2011 | Balinsky et al. |
| 2011/0055702 A1 | 3/2011 | Jakobson |
| 2011/0060844 A1 | 3/2011 | Allan et al. |
| 2011/0066668 A1 | 3/2011 | Guarraci |
| 2011/0066957 A1 | 3/2011 | Prats et al. |
| 2011/0078246 A1 | 3/2011 | Dittmer-Roche |
| 2011/0085211 A1 | 4/2011 | King et al. |
| 2011/0099093 A1 | 4/2011 | Mills |
| 2011/0137979 A1 | 6/2011 | Seo et al. |
| 2011/0154185 A1 | 6/2011 | Kern et al. |
| 2011/0161413 A1 | 6/2011 | Cierniak et al. |
| 2011/0164043 A1 | 7/2011 | Arora et al. |
| 2011/0164784 A1 | 7/2011 | Grill et al. |
| 2011/0179427 A1 | 7/2011 | Krishnamoorthy et al. |
| 2011/0202672 A1 | 8/2011 | Narayanaswamy et al. |
| 2011/0209052 A1 | 8/2011 | Parker et al. |
| 2011/0219331 A1 | 9/2011 | DeLuca et al. |
| 2011/0231912 A1 | 9/2011 | Lee et al. |
| 2011/0238663 A1 | 9/2011 | Zhang |
| 2011/0252038 A1 | 10/2011 | Schmidt et al. |
| 2011/0252299 A1 | 10/2011 | Lloyd et al. |
| 2011/0252335 A1 | 10/2011 | Lloyd et al. |
| 2011/0252339 A1 | 10/2011 | Lemonik et al. |
| 2011/0264712 A1 | 10/2011 | Ylonen |
| 2011/0282933 A1 | 11/2011 | Schmier |
| 2011/0295593 A1 | 12/2011 | Raghuveer |
| 2011/0296299 A1 | 12/2011 | Parker |
| 2012/0005159 A1 | 1/2012 | Wang et al. |
| 2012/0023407 A1 | 1/2012 | Taylor |
| 2012/0036423 A1 | 2/2012 | Haynes, II et al. |
| 2012/0047434 A1 | 2/2012 | Ginetti |
| 2012/0072821 A1 | 3/2012 | Bowling |
| 2012/0095878 A1 | 4/2012 | Feldman et al. |
| 2012/0099135 A1 | 4/2012 | Ono |
| 2012/0110445 A1 | 5/2012 | Greenspan et al. |
| 2012/0110646 A1 | 5/2012 | Ajitomi et al. |
| 2012/0117406 A1 | 5/2012 | Eun |
| 2012/0117452 A1 | 5/2012 | Lloyd et al. |
| 2012/0131483 A1 | 5/2012 | Archer et al. |
| 2012/0144202 A1 | 6/2012 | Counterman |
| 2012/0144454 A1 | 6/2012 | Lee |
| 2012/0185759 A1 | 7/2012 | Balinsky et al. |
| 2012/0210210 A1 | 8/2012 | Itoh et al. |
| 2012/0233543 A1 | 9/2012 | Vagell et al. |
| 2012/0240027 A1 | 9/2012 | Pereira et al. |
| 2012/0254042 A1 | 10/2012 | Ludemann |
| 2012/0266229 A1 | 10/2012 | Simone et al. |
| 2012/0278401 A1 | 11/2012 | Meisels et al. |
| 2013/0036455 A1 | 2/2013 | Bodi et al. |
| 2013/0047072 A1 | 2/2013 | Bailor |
| 2013/0086670 A1 | 4/2013 | Vangpat et al. |
| 2013/0097490 A1 | 4/2013 | Kotler et al. |
| 2013/0103387 A1 | 4/2013 | Kinder |
| 2013/0111336 A1 | 5/2013 | Dorman et al. |
| 2013/0124606 A1 | 5/2013 | Carpenter et al. |
| 2013/0155071 A1* | 6/2013 | Chan ...................... G06T 13/00 345/473 |
| 2013/0159849 A1* | 6/2013 | Lee ...................... G06F 17/2288 715/272 |
| 2013/0262373 A1 | 10/2013 | Rampson |
| 2013/0275884 A1 | 10/2013 | Katragadda et al. |
| 2013/0283147 A1* | 10/2013 | Wong ...................... G06F 17/21 715/234 |
| 2013/0326330 A1 | 12/2013 | Harris et al. |
| 2014/0082470 A1 | 3/2014 | Trebas et al. |
| 2014/0149857 A1 | 5/2014 | Vagell et al. |
| 2014/0164255 A1 | 6/2014 | Daly et al. |
| 2014/0165087 A1 | 6/2014 | Smith et al. |
| 2014/0280377 A1* | 9/2014 | Frew ...................... G06F 17/241 707/805 |

OTHER PUBLICATIONS

"File;" Microsoft Computer Dictionary; May 1, 2002; Microsoft Press; Fifth Edition; p. 266.
"Google Docs 4 Everyone" http://Jwww.scribd.com/doc/14119795/Google-Docs-4-Everyone Published Feb. 2009 Steven Holzner.
"Googlepedia: The Ultimate Google Resource, Third Edition" pp. 1-24 (pp. 276-287 in original source).
"Simultaneously edit a presentation with other authors," by MicrosoftTM Office: MAC, published Nov. 11, 2010, pp. 1-4.
"Using Adobe Buzzword", 2008, pp. 1-35.
<http:/www-archive.mozilla.org/(2rojects/webservice retrieved from the Internet Dec. 13, 2013.
1-3, retrieved from the Internet May 24, 2012: http://code.google.com/p/wave-protocol/source/browse/srcJorg/waveprotocol/wave/clienVeditor/exampleslimg/MyDoodad.java.
28th International Conference in Human Factors in Computing Systems, Apr. 10, 2010, 683-692.
Beresford et al., "MockDroid: Trading Privacy for Application Functionality on Smartphones," HotMobile '11 Mar. 1-3, 2011, Phoenix, AZ, USA.

(56) References Cited

OTHER PUBLICATIONS

Bibi et al., "A Platform for Delivering Multimedia Presentations on Cultural Heritage," 2010 14th Panhellenic Conference on Informatics, pp. 175-179.
Brouwer et al., MathDox editor, Electronic Proceedings MathUI 2009, 2009, XP55028009, retrieved from the Internet May 23, 2012: <http://Www/>win.tue.nl/hansc/mde.pdf.
Cayenne-McCall, "Synchronous 3D Document Collaboration," Pace University, Department of Computer Sciene; Nov. 2008. (42 Pages).
Chevalier et al., Using Text Animated Transitions to Support Navigation in Document Histories, Apr. 10-15, 2010, pp. 10.
Chitu, Footnotes in GoogleDocs, Oct. 17, 2008, XP055028085, retrieved from the Internet May 24, 2012: http://googlesystem.blogspot.com/2008/10/footnotes-in-google-docs.html.
Cooperative Word (2004) 13, (copyright 2005) ("MAUI").
Dan R. Herrick, Google This! Using Google Apps for Collaboration and Productivity, Proceedings of the ACM SIGUCCS Fall Conference on User Services Conference, SIGUCCS '09, Jan. 1, 2009, 55.
Danilatos, Riche Text Editor—Message dated Jun. 10, 2010 8:57am, Wave Protocol Group Discussion Forum, Jun. 10, 2010, XP055027976, retrieved from the Internet May 23, 2012: https://groups.google.com/group/wave-protocol/browse_thread/threadl73608bf7a13f2385.
Danilatos. Demonstration Doodad, with a few different variations of rendering and interactive behaviour, Dec. 5, 2010.
De Lara et al., "Puppeteer: Component-Based Adaptation for Mobile Computing," Proceedings of the 3rd USE IX Symposium on Internet Techonologies and Systems, 14 pages (Mar. 27, 2001).
Ellis et al., "Concurrency Control in Groupware Systems," ACM 1989, pp. 399-407.
Ellis et al., Groupware Some Issues and Experiences, Communications of the Association for Computina Machinery, ACM, 34:1, Jan. 1, 1991, 38-58.
Frazer, "Differential Synchronization," Google, Munich, Germany (2009) 8 pages.
Gutwin et al.,"Improving Network Efficiency in Real-Time Groupware with General Message Compression," University of Saskatchewan, Canada, University of Canterbury, 10 pages, New Zealand (2006).
Hashemi, "ambigity Resolution by Reording Rules in Text Containing Errors," Association for Computational Linguistics, 62(1):69-70 (2007).
Hearnden, Wave Editor & Document Renders. A talk by Dave Hearnden at teh Wave Summit captured in video on YouTube Nov. 12, 2010, retrieved from the Internet 5123/2012: http:J/youtu.beiEuXApEullzc.
Hodel et al., "Supporting Collaborative Layouting in Word Processing," University of Zurich, Department of Inforamtics; Zurich, Switzerland, 2004 (18 page).
http://web.archive.org/webb/20120512130530/https://developer.mozilla.org/en/Setting_up_extension_development_environment.
http://web.archive.org/web/20120819143535/https://addons.mozilla.org/en-US/firefox/extensions/?sort=featured.
http://web.archive.org/web/20121020134710/https://addons.mozilla.org/en-US/seamonkey/extensions.
http://web.archive.org/web/20121021135356/http://support.mozilla.org/en-US/kb/find-and-install-add-ons-add-features-to-firefox.
https://addons.mozilla.org/En-us/seamonkey/addon/gmail-smime/?src=search.
Huang et al., "A General Purpose Virtual Collaboration Room," Google 1999, pp. 1-9.
Ignat et al., "Awareness of Concurrent Changes in Distributed Software Development," Nancy-Universite, France 2008 (9 pages).
International Search Report and Written Opinion dated Feb. 25, 2014 in International Application No. PCT/US2013/043011.
International Search Report and Written Opinion dated Mar. 5, 2015 in International Application No. PCT/US2014/058275.
International Search Report and Written Opinion for PCT/US2012/028069 dated Jun. 1, 2012, 1-7.
International Search Report and Written Opinion issued in PCT/US2012/028279 dated Jun. 6, 2012.
Jason Hill & Carl Gutwin, "The MAUI Toolkit: Groupware Widgets for Group Awareness," p. 539-571 in Computer Supported.
John Day-Richter, Internet Archive of Online Article; What's Different About the New Google Docs: Making Collaboration Fast, Sep. 9, 2010, 1-6, http:f/web.archive.org/web/20100927180700/http:J/googledocs.blogspot.com/2010/09/whats-different-about-new-google-docs_23.html, retrieved Feb. 14, 2012.
Kindberg, "Mushroom: A Framework for Collaboration and Interaction across the Internet," Google 1996, pp. 1-11.
Krieger, "Documents, Presentations, and Workbooks: Using Microsoft® Office to Create Content That Gets Noticed," published May 2011, pp. 1-104.
Masoodian, M., et al., "RECOLED: A Group-Aware Collaborative Text Editor for Capturing Document History," In Proceedings of IADIS International Conference on WWW/Internet, Lisbon, Portugal, Oct. 19-22, 2005, International Association for Development of the Information Society, vol. 1, 323-330.
Muhammad et al., "Awareness Elements in Web Based Cooperative Writing Applications," Second Asia-Pacific Conference on Computationa Intelligence and Industrial Applications, 18 pages (2009).
Mulvany, "What's Going on in Indexing," ACM 1997, pp. 10-15.
Munteaunu et al., "Collaborative Editing for Improved Usefulness and Usability of Transcript-Enhanced Webcasts," ACM 2008, pp. 373-382.
Nasir et al., "Collaborative Report Creation System for Industrial Use," Yamagata University, Graduate School of Science and Engineering; Yamagata, Japan 2009 (6 pages).
Nauman et al., "Apex: Extending Android Permission Model and Enforcement with User-Defined Runtime Constraints," ASIACCS '10 Apr. 13-16, 2010 Beijing, China.
Nichols et al., High-Latency, Low-Bandwidth Windowing in the Jupiter Collaboration System, UIST '95. 8th Annual Symposium on User Interface Software and Technology. Proceedings of the ACM Symposium on User Interface Software and Technology, Nov. 14-17, 1995, 111-120.
Pacull et al., "Duplex: A Distributed Collaborative Editing Environment in Large Scale," ACM1994, pp. 165-173.
Peels et al., Document Architecture and Text Formatting, ACM Transactions on Office Information Systems, XX, XX, 310/1/1985, 347-369.
Raman, "Cloud Computing and Equal Access for All," Google Inc. 2008 (4 pages).
Shen et al., "Flexible Merging for Asynchronouse Collaborative Systems," Griffith University, School of Computing an Information Technology, Brisbane, Australia 2002 (18 pages).
Shen et al., "Integrating Advanced Collaborative Capabilitites into Web-Based Word Processors," Nauyang Technological University, School of Computer Engineering, Singapore 2007 (8 pages).
The Oauth 2.0 Authorization Protocol; draft Ietf-oauth-v2-24; Mar. 8, 2012.
Using Adobe Flash Professional CS5 & CS5.5, Jan. 16, 2012, Adobe Systems Incorporated, pp. 125-126, http://help.adobe.com/en US/flash/cs/using/flash_cs5_help.pdf.
Wang et al. Google Wave Operational Transformation, Jul. 1, 2010, 1-6, retrieved from the Internet Feb. 14, 2012: http://1wave-protocol.googlecode.comfhg/Whitepapers/operational-transform/operational-transform.html.
Wempen, Faithe, "PowerPoint 2010 Bible," May 24, 2010, John Wiley & Sons, pp. 491-519.
Zafer "NetEdit: A Collaborative Editor," Blacksburt, Virginia 89 pages (Apr. 23, 2011).
Zhou et al., "Taming Information-Stealing Smartphone Applications (on Android)," LNCS 6740:93-107 (2011).
Geoff Hart, "Using Microsoft Word's "track changes" editing feature: a short guide for authors and editors", 2011, Using Word's revision tracking, pp. 5.
International Search Report and Written Opinion dated Feb. 26, 2014 in International Application No. PCT/US2013/071171.
"CoDoc: Multi-mode Collaboration over Documents", Ignat, Claudia Levinia et al; CAiSE, Jan. 1, 2004, pp. 580-594; Retrieved from

(56) References Cited

OTHER PUBLICATIONS the Internet: URL:http://www.springerlink.com/content/mffh585tc0ntcype/fulltext.pdf [retrieved on Jun. 17, 2011].
Flexible Merging for Asynchronous Collaborative Systems, In: "On the Move to Meaningful Internet Systems 2002: CoopIS, DOA, and ODBASE", Shen, Haifeng et al, Springer Berlin Heidelberg, Berlin, Heidelberg (Nov. 5, 2002); vol. 2519, pp. 304-321.
International Search Report and Written Opinion dated Dec. 3, 2014 in International Application No. PCT/US2014/048408.

* cited by examiner

| USER ID | USER TYPE |
|---|---|
| USER A | REVIEWER |
| USER B | REVIEWER |
| USER C | REVIEWER |
| USER D | EDITOR |
| USER E | EDITOR |

FIG. 2

| SUGGESTED EDIT ID | WHO SUGGESTED? | DEPENDENT ON ANOTHER EDIT | EDIT TYPE | EDIT POSITION |
|---|---|---|---|---|
| 1254 | REVIEWER A | N/A | ADDITION | 9817 |
| 574 | REVIEWER B | N/A | DELETION | 9674 |
| 687 | REVIEWER C | N/A | ADDITION | 9326 |
| 1345 | EDITOR D | 1254 | ADDITION | 9817.1 |

FIG. 3 ed edit

SYSTEMS AND METHODS FOR RESOLVING PRIVILEGED EDITS WITHIN SUGGESTED EDITS

RELATED APPLICATIONS

This application is a continuation application of co-pending U.S. patent application Ser. No. 13/970,090, filed Aug. 19, 2013, entitled, "SYSTEMS AND METHODS FOR RESOLVING PRIVILEGED EDITS WITHIN SUGGESTED EDITS," which is herein incorporated by reference.

FIELD OF THE INVENTION

In general, this disclosure relates to electronic documents, in particular, to systems and methods for detecting relationships between edits and resolving privileged edits within suggested edits.

BACKGROUND

During development of an electronic document, it is often desirable to have multiple users propose changes and comment on a draft of the electronic document. For example, an author may create an initial draft of an electronic document and send a copy of the electronic document to one or more reviewers to make comments or changes in the document. Each reviewer may independently propose changes or make comments in the electronic document and return a revised version of the electronic document back to the author. Since each reviewer may create a unique version of the electronic document, there may be conflicts across different versions. The original author will need to resolve the conflicting edits and re-send updated copies of the electronic document to the reviewers. These steps will need to be repeated until the author and all of the reviewers are satisfied with a version of the electronic document. One way to increase the efficiency of this process is to allow multiple users to simultaneously make changes in a document.

SUMMARY

Systems and methods are disclosed herein for efficient editing of a document. One aspect relates to a system or method for incorporating a first edit into a second edit in an electronic document. The first edit and the second edit in the electronic document are received, and a shared position of the first edit and the second edit in the electronic document is identified. The second edit is determined to be privileged relative to the first edit by determining that the first edit is made by a first user with a first set of permissions and the second edit is made by a second user with a second set of permissions larger than the first set of permissions. When the second edit is privileged relative to the first edit, the second edit is incorporated into the first edit.

BRIEF DESCRIPTION OF THE DRAWINGS

The above and other features of the present disclosure, including its nature and its various advantages, will be more apparent upon consideration of the following detailed description, taken in conjunction with the accompanying drawings in which:

FIG. 2 is an example data structure stored on an electronic database that includes a document access control list, according to an illustrative embodiment.

FIG. 3 is an example data structure stored on an electronic database that includes metadata corresponding to suggested edits, according to an illustrative embodiment.

DETAILED DESCRIPTION

To provide an overall understanding of the disclosure, certain illustrative embodiments will now be described, including a system for incorporating one edit into another edit. In particular, detecting a relationship between two edits allows for efficient development of a document. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
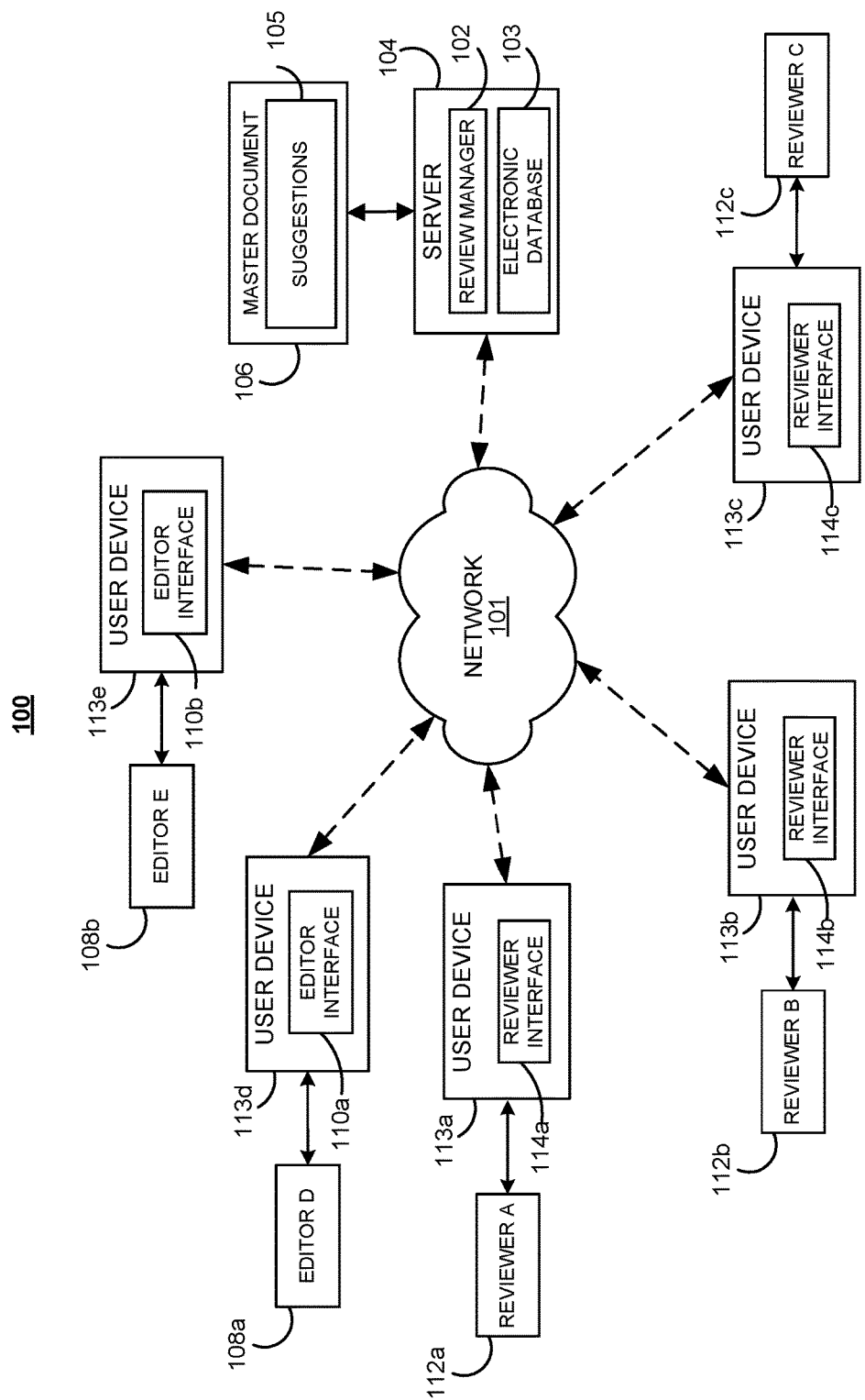
FIG. 1 is a block diagram of a computerized system for integrating collaboratively proposed changes and publishing an electronic document, according to an illustrative embodiment.

FIGS. 1-3 are diagrams of a network and database structures that may be used to implement the systems and methods disclosed herein. FIG. 1 is a block diagram of a computerized system 100 for detecting relationships between edits and acting on a subset of edits, according to an illustrative embodiment. System 100 includes a server 104 and five user devices 113*a*-113*e* (generally, user device 113) connected over a network 101. The server 104 includes a review manager 102, which manages updates to various versions of a master document 106.

The review manager 102 is configured to transmit and receive data over the network 101 in communication with the user devices 113. In particular, the review manager 102 receives data indicative of changes that a user at a user device 113 wishes to suggest or create related to the master document 106. Depending on the user type, which sets the access permissions for the user to access the master document 106, the review manager 102 then creates these changes by appending to a list of suggestions 105 corresponding to the master document 106. The list of suggestions 105 may be stored in the form of a data structure, an example of which is described in more detail in relation to FIG. 3.

The review manager 102 may include a processor and a memory unit. The memory unit stores computer executable instructions, which are executed by the processor. The computer executable instructions include instructions for receiving data over the network 101, determining a user type for a given user, making changes in the master document 106, and publishing various versions of the document 106 to various users. As depicted in FIG. 1, the master document 106 is stored on a separate device from the server 104, but the master document 106 may also be stored in the electronic database 103 or even in a memory unit included within the review manager 102. In addition, any data described herein as being stored on the electronic database 103 may instead or additionally be stored in a memory unit in the review manager 102 or on a separate memory unit external to the server 104.

Users at user devices 113 may simultaneously interact with the master document 106 over user interfaces 110 or 114. In particular, FIG. 1 depicts five users, each associated with a user type defining a level of authority for access to and editing capabilities of certain versions of the master document. Specifically, FIG. 1 depicts three reviewers 112a-112c (generally, reviewer 112) and two editors 108a-108b (generally, editor 108). Each reviewer 112 interacts with the master document 106 over a reviewer interface 114a-114c (generally, reviewer interface 114), and the editors 108 interact with the master document over an editor interface 110a-110b (generally, editor interface 110).

Each user device 113 may include a device such as a personal computer, a laptop computer, a tablet, a smart phone, a personal digital assistant, or any other suitable type of computer of communication device. Users at the user devices access and receive information from the server 104 over the network 101. The user devices 113 may include typical components, for example, an input device, an output device, and a communication interface (e.g., editor interfaces 110 or reviewer interfaces 114). A user may authenticate with the server 104 by inputting a user name and password (or providing other identification information) via a user interface, such that the same user device may be used by different users at different times, including users with the same or different user type.

Users interact with the server 104 such that the users, in conjunction with the server 104, generate an online document by collaboratively proposing changes in the document 106. Although illustrated as a single device in FIG. 1, the server 104 may be implemented as, for example, a single computing device or as multiple distributed computing devices. The interaction of users with the server 104 is through user interfaces 114 and 110, which may include web browsers. For example, the document may be viewed with an application that displays the document within a web browser. In this arrangement, users do not need to install software locally to their user devices to view and make changes in the document. When browsers or user interfaces are discussed herein, these terms are intended to refer to any program that allows a user to browse documents, regardless of whether the browser program is a standalone program or an embedded program, such as a browser program included as part of an operating system. The logic described herein can be implemented in hardware, software, firmware, or a combination thereof.

In an example, the document 106 is a text document. One of skill in the art will understand that the features and concepts described herein may be applied in any type of collaborative document application, including, for example, spreadsheet applications, presentation applications, drawing applications, and others.

One type of document user is reviewer 112, who has certain authority and access to the document. Typically a reviewer may view and make suggested edits and comments on the document 106. To do this, the reviewer 112 views a version of the document on the reviewer interface 114 and makes a change to the document. Data indicative of the change is sent over the network 101 to the server 104, where the review manager 102 receives the data and adds the data to the list of suggestions 105 associated with the document 106. The change may be a suggested edit to the document 106, such as an insertion, deletion, replacement, move, format change, or any other suitable change in a document. In another example, the change may be a comment on the document 106 or a portion thereof. Changes of different types (such as insertions, deletions, replacements, moves, format changes, or comments, for example) may be saved differently in the list of suggestions 105. For example, different lists may be used to store changes of different types. As another example, changes of different types may be stored together as entries in one list, with each entry having a label indicative of the change type.

Another user type is an editor 108, who has a greater level of authority (i.e., a larger set of permissions) for the document 106 than the reviewer 112. The editor 108 can accept or reject any suggested edits made by the reviewer 112, and further can delete any comments made by the reviewer 112. Access and authority may vary and be customized for a document allowing different access and use capabilities for different users. For example, the editor 108 may be an owner or a creator of the document 106, and the editor 108 may assign one or more users to a reviewer type role. When a reviewer (such as reviewer 112a) makes a suggested edit to the document 106, the editor 108 (such as editor 108a) is prompted to either accept or reject the suggested edit. When a suggested edit is accepted by the editor 108, the review manager 102 converts the suggested edit into an accepted edit and updates the master document 106 with the accepted edit. In addition, the accepted edit may be removed from the list of suggestions 105, or an indicator label may be set for the accepted edit to indicate that the edit has been accepted. If the editor 108 rejects a suggested edit, the review manager 102 removes the suggested edit from the list of suggestions 105, or an indicator label may be set for the edit to indicate that the edit has been rejected or dismissed.

In addition to accepting or rejecting changes made by the reviewer 112, the editor 108 also has access to make direct changes to the document by directly editing or to make comments on the document 106. The review manager 102 generally treats edits made by the editor 108 as accepted edits which are automatically accepted. Alternatively, the editor 108 may wish to make a suggested edit in order to get input from the reviewer 112 or other editors regarding the suggested edit. In this case, the editor 108 may mark an edit as "suggested" or may set the user device 109 to operate in "reviewer mode," such that the suggested edit appears in the list of suggestions 105 of the document to the reviewer 112. Then, the reviewer 112 may modify the suggested edit or comment on the suggested edit, and the editor 108 may then decide whether to accept or reject the suggested edit(s).

In addition, the editor 108 has permission to make direct changes to the changes that are made by the reviewer 112. For example, editor 108a, rather than accepting or rejecting a suggested change made by reviewer 112a, instead may modify the suggested change. The review manager 102 detects that an editor 108 (a user with greater privileges) has modified a suggested change originally created by a reviewer 112 (a user with fewer privileges), thereby determining that the modification made by the editor 108 is privileged relative to the suggested change made by the reviewer 112. Because of the privileged modification to the reviewer's suggested change, the editor 108a's modification is incorporated into the reviewer 112a's suggested change. By integrating or combining the modification with the suggested change, when the suggested change is accepted (or rejected) by an editor (editor 108b, for example), the modification by editor 108a is also accepted (or rejected). This process is described in further detail in relation to FIGS. 9 and 10.

Thus, in addition to managing the list of suggestions 105 for the master document 106, the review manager 102 also keeps track of relationships between suggested edits in the list of suggestions 105. In particular, the review manager 102 may include a compound identifier. The compound identifier may identify a shared position between two or more suggested edits in the document 106 and may determine that the suggested edits that share a position in the document 106 have a "compounding relationship." Any identified compounding relationships associated with the master document 106 may be stored even when the master document 106 is closed. In this case, the relationships may be loaded from a stored location when the document 106 is loaded or displayed. Alternatively, the relationships may be discarded when the document 106 is closed, and the review manager 102 may identify compounding relationships each time the document 106 is loaded or displayed.

Two suggested edits have a compounding relationship if one of the suggested edits is dependent on the other suggested edit. The compounding relationship is independent of the relative privileges associated with the edits. For example, the reviewer 112a may make a first suggested edit such as an insertion of some text into the document 106. Then, the reviewer 112b may make a second suggested edit such as a change within the suggested insertion made by reviewer 112a. The reviewer 112b may suggest making another insertion, making a deletion, fixing a spelling mistake, or any other change of the suggested insertion made by reviewer 112a. In this case, the second suggested edit has a compounding relationship with the first suggested edit, and when the second suggested edit is made, the review manager 102 detects the compounding relationship and may store an indication of the compounding relationship in the list of suggestions 105.

However, a compounding relationship between two edits with the same set of privileges is not sufficient for the review manager 102 to incorporate one edit into the other edit. In particular, to incorporate a second edit into a first edit, the second edit should be privileged relative to the first edit, and the edits should have a compounding relationship. In particular, if the second edit was created by an editor 108 (rather than the reviewer 112b), then the review manager 102 would incorporate the second edit into the first suggested edit. When the second edit modifies the first suggested edit, the second edit may be treated as part of the first suggested edit with a pending status, even though the second edit was created by an editor 108. An example view of a display of a document 106 with compounding suggested edits (where the second suggested edit is privileged relative to the first suggested edit) is shown and described in more detail in relation to FIGS. 5-7.

Figure 6:
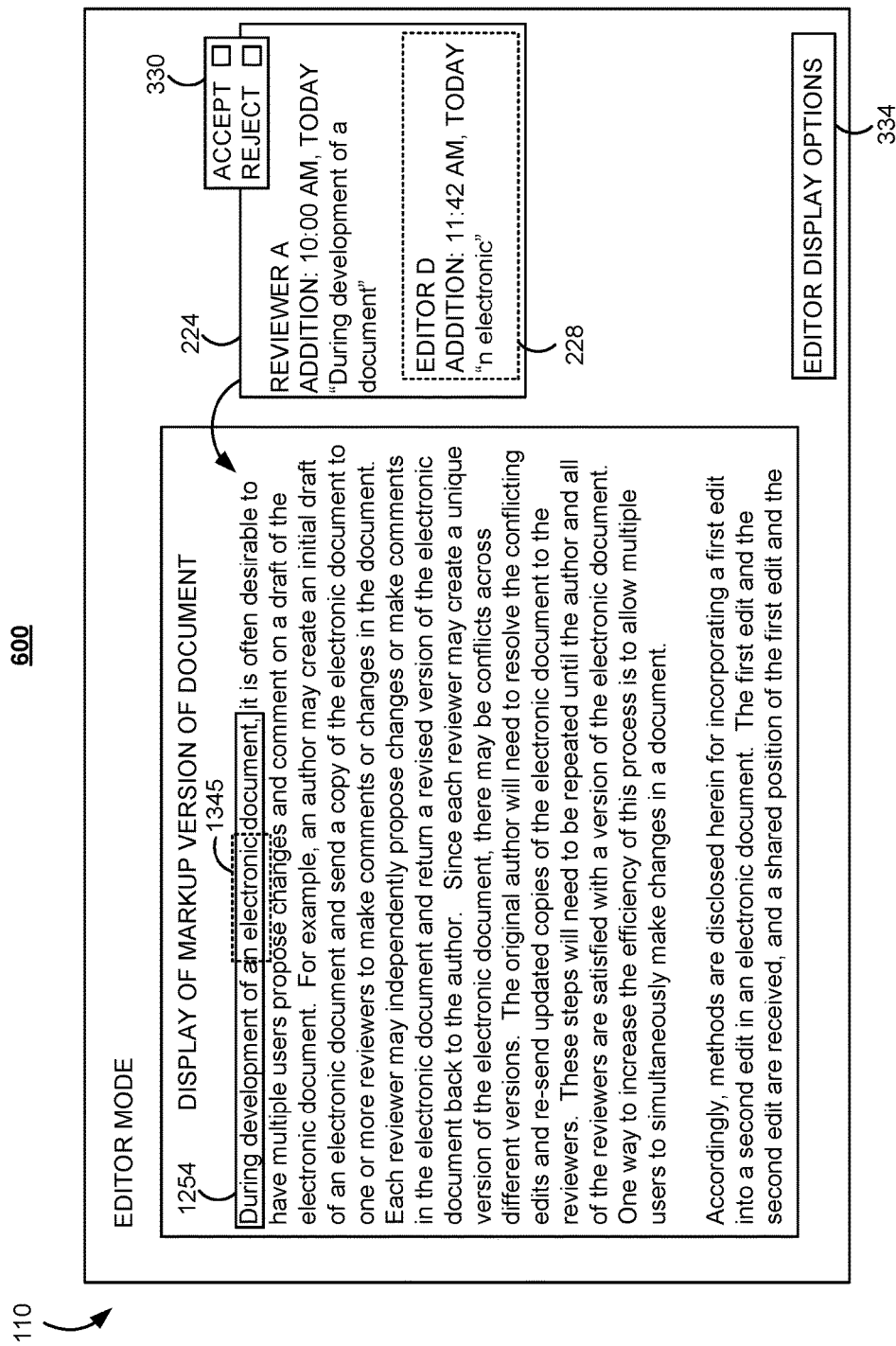
FIGS. 6 and 7 are diagrams of exemplary displays of an editor interface for interacting with a document with incorporated suggested edits, according to an illustrative embodiment.
Figure 7:
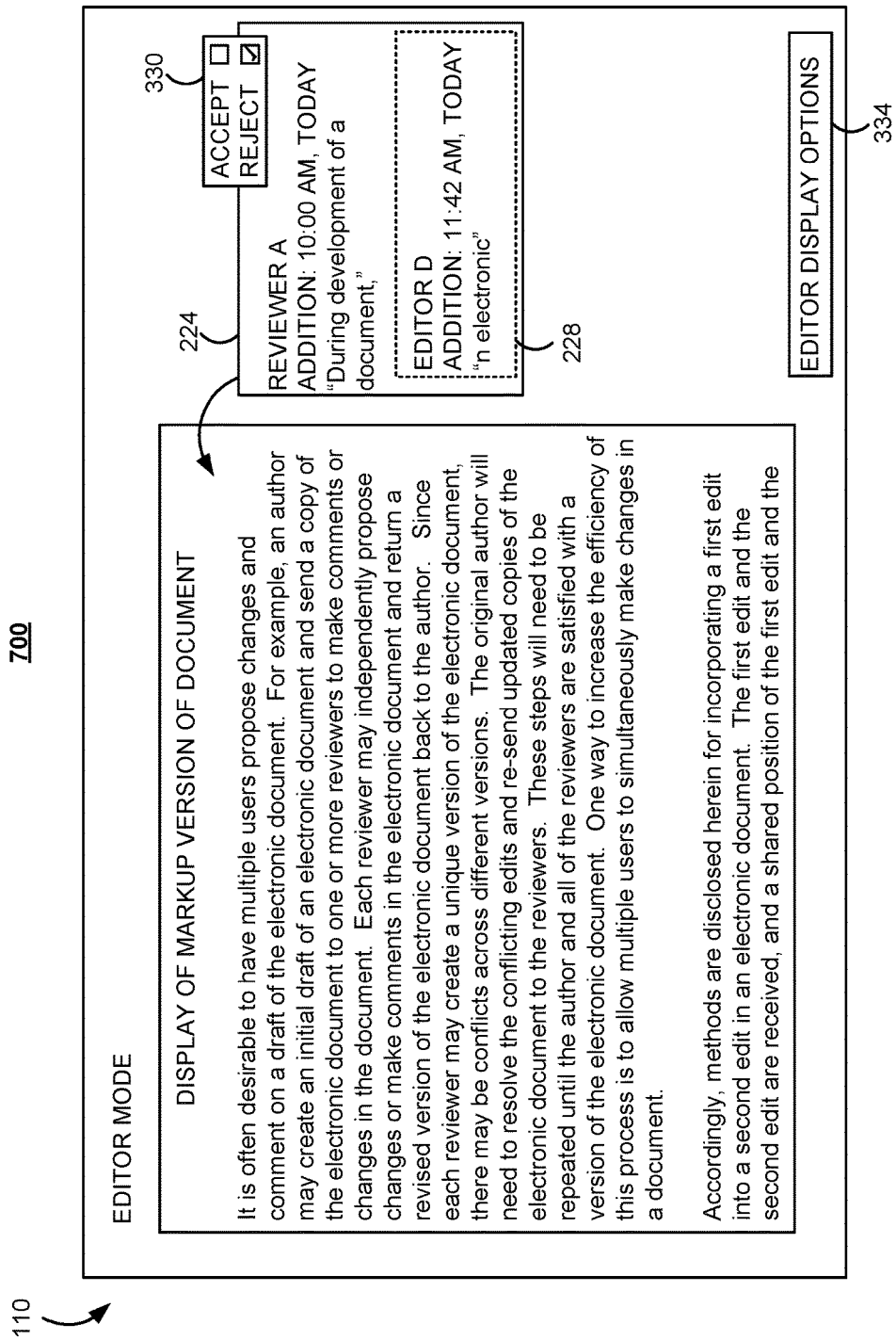

When an edit is incorporated into another edit, an indication of the incorporation may be stored and displayed to a user. For example, the list of suggestions 105 may be updated to include annotations indicative of which edits are incorporated into which edits. Furthermore, the review manager 102 may provide visual indicators of any incorporations over a user interface. As shown in FIGS. 6 and 7, a sidebar region may show metadata regions associated with incorporated suggested edits included within a metadata region associated with a first suggested edit. In particular, for suggested edits that are incorporated with a first suggested edit, an editor 108 may not have the option of accepting or rejecting any of the incorporated suggested edits because acceptance or rejection of the first suggested edit automatically results in acceptance or rejection of the incorporated suggested edits. Therefore, knowledge of any incorporating relationships between suggested edits may lead to efficient development of the document 106. An example of a data structure for storing the list of suggestions 105 is described in more detail in relation to FIG. 3.

As described herein, a first suggested edit is created by a reviewer 112, and a second (privileged) suggested edit is created by an editor 108. However, in general, an editor 108 may have an option of operating in a "reviewer" or comment mode, such that changes that the editor 108 makes to the document 106 are interpreted as pending suggested changes rather than direct changes to the document 106. In this case, the first suggested edit (which is less privileged than the second suggested edit) may be created by an editor 108.

The updates to the master document 106 and the list of suggestions 105 are performed nearly in real-time. This means that when the reviewer 112 and the editor 108 are simultaneously viewing and accessing the document, the reviewer 112 receives feedback regarding a suggested edit almost immediately after the editor 108 sends the feedback. The system 100 is especially advantageous for the case when a suggested edit made by the reviewer 112 may affect additional suggested edits made by the reviewer 112. For example, it is helpful for the reviewer 112 to receive early feedback from an editor 108 regarding a suggested edit because the feedback may influence future suggested edits. The real-time updates to the document 106 also allow for reviewers 112 to make suggestions at their own pace. Even when just a single reviewer 112 has the document 106 open, indications of the suggestions or comments that are made by the active reviewer 112 may be sent to other users, such as other reviewers 112 or one or more editors 108. The notifications may be sent over email messages or any other form of communications that may alert an editor and/or reviewer to the suggested changes. An editor 108 may then access the document 106 at a later time and accept, reject, or modify a suggestion made by the reviewer 112. In some implementations, the notifications are sent only to the one or more editors 108, and not to any of the other reviewers 108.

When the interfaces 110 and 114 include web browsers, different versions of the document (for example, a markup version, a clean version, or various historical versions of the document, such as those including a selected group of the suggested and/or accepted edits) may be saved to different network locations. The editor 108 may select which versions of the master document 106 are saved to which network location, and may further select to display a version of the document in a particular format, such as in browser format, html format, or any other suitable format for displaying an electronic document. In addition, a user such as a reviewer 112 and/or an editor 108 may select to view the master document 106 including any suggested edit satisfying one or more criteria. As an example, a user may wish to view only suggested edits of a certain type, such as insertions, deletions, replacements, format changes, spelling mistakes, or any other suitable type of suggested edit.

The reviewer 112 and the editor 108 may view who else is currently viewing the document. When more than one user views the document at a time, the users may communicate with each other over an instant messaging application.

Two editors and three reviewers are shown in FIG. 1 to avoid complicating the drawing; however the system 100 can support any number of users with the same or different user type. When there are multiple reviewers, a reviewer (i.e., reviewer 112a) may view suggested edits and comments made by other reviewers (i.e., reviewers 112b and 112c) or editors. In this way, by allowing for efficient collaboration across a set of users proposing changes in a document, the system 100 offers significant advantages over a system in which reviewers independently propose changes in a document. Thus, when an editor 108 views the document, the editor 108 may view a live stream of collaborative updates made by multiple reviewers 112 at the same time, significantly reducing the amount of time to develop the document. In addition, a third type of user is a viewer (not shown), who may view the document 106 including any accepted edits, but not any pending suggested edits (that have not yet been accepted or rejected). In some implementations, a viewer may be allowed to view pending suggested edits.

In certain implementations, each user may be assigned a unique color, such that the changes of a version of the document are color-coded by the user who made the changes. In addition, changes made by editors 108 may be marked differently on view of the document from changes made by reviewers. Further, a user may select to view the document 106 including all suggested edits of a certain type, such as all suggested edits made by a particular user or type of user, or all suggested edits corresponding to a specific edit type, such as all insertions, deletions, replacements, moves, format changes, spelling changes, or any other suitable edit type. An editor 108 may, at once, accept or reject all suggested edits made by a particular user or all suggested edits corresponding to a specific edit type.

FIG. 2 is an example data structure 117 stored on electronic database 103 that includes a document access control list, according to an illustrative embodiment. The document access control list includes a list of users who have access to a version of the master document 106 and their corresponding user types. In this case, multiple users have the same user type. In particular, there are three reviewers (users A-C) and two editors (users D and E), all of whom may simultaneously interact with the master document 106.

FIG. 3 depicts an exemplary data structure 118 stored on the electronic database 103 that includes metadata corresponding to suggested edits, according to an illustrative embodiment. The data structure 118 includes four records of suggested edits. Each record in the data structure 118 includes a "suggested edit id" field whose values include identification numbers for the edits. Each record in the data structure 118 corresponds to a suggested edit and further includes the user id of the user who suggested the edit, an indicator of any other suggested edit on which the suggested edit depends, an edit type associated with the suggested edit (i.e., addition, deletion, move, replacement, format changes, spelling changes, or any other suitable edit type), and an edit position identifier that indicates a position of the edit in the electronic document 106. The data structure 118 indicates that the suggested edit 1345 has a shared edit position with the suggested edit 1254 because the edit position identifiers associated with both suggested edits are similar. As shown in FIG. 3, the edit position identifier is a four digit number, which may correspond to distinct locations within the electronic document 106. The edit position identifier for the suggested edit 1345 is the same as the edit position identifier for the suggested edit 1254, with an additional incremental value. The incremental value may indicate a location within the suggested edit 1254 where the suggested edit 1345 takes place. In general, the edit position identifier may be any suitable identifier, such as a pointer to a location in the document, an address that stores such a pointer, or any other suitable way of referring to a position in a document.

From the shared edit position, the review manager 102 may determine that the suggested edit 1345 depends on (or equivalently, has a compounding relationship with) the suggested edit 1254. The data structure 118 is shown for illustrative purposes only, and other fields with additional data may also be included. Examples of such additional data include the time of the suggested edit, whether the suggested edit was accepted or rejected, who accepted or rejected the suggested edit, and the time of the acceptance or rejection. Furthermore, when a suggested edit includes deleting, moving, or replacing existing objects in the document, the data structure 118 may further include which objects to delete, move, or replace. Similarly, when a suggested edit includes adding objects, the data structure 118 may further include which object(s) to add.

In some embodiments, the data related to a suggested edit may be stored as a mutation of the document. For example, a mutation may include data indicating changes made by the edit such as the user id of the user who created the suggested edit, deletions, additions, location of the edit, and a status of the edit, such as pending, rejected, or accepted.

Data structures 117 and 118 and the master document 106 may be stored on the same electronic database 103, or may be stored on different databases. In some embodiments, an original version of the master document 106 is stored on a database. For example, the combination of the original version and data structure 118 would be enough to generate versions of the document using a dynamic approach. In particular, if a user wishes to view only a subset of the suggested edits, a version of the document may be generated including the original version and the subset of suggested edits. The subset may include those suggested edits corresponding to a specific user, a user type, or an edit type. The generated version may not be stored on a database. Instead, when a user accesses the document, a version specific to that user (based on the user's settings) may be generated.

In addition to the data stored in example data structures 117 and 118, the review manager 102 may also store additional data. For example, data indicative of how all users interact with the document may be stored such as what portions of the document are most viewed or read.

Figure 4:
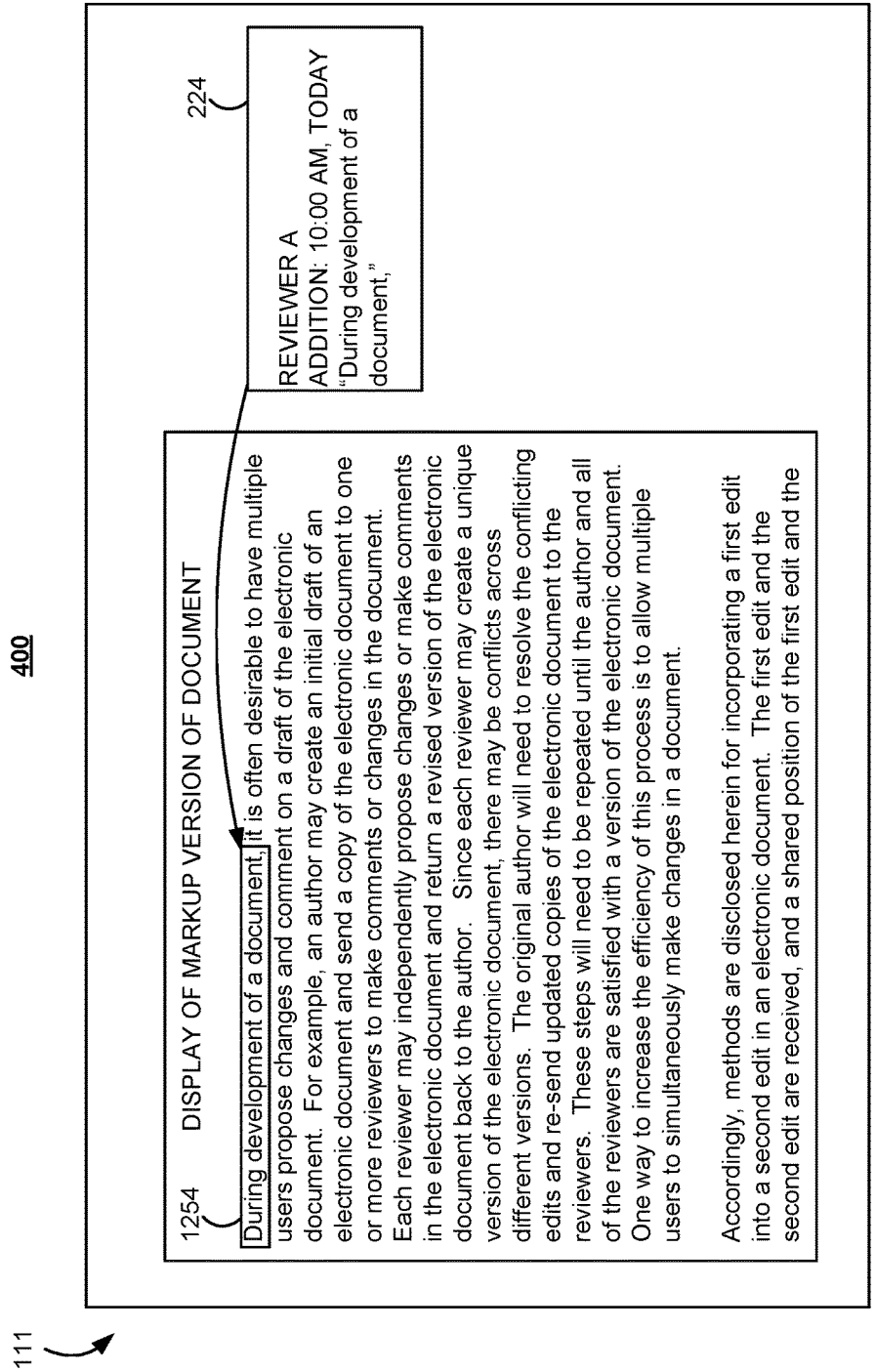
FIGS. 4 and 5 are diagrams of exemplary displays of a user interface for interacting with a document with incorporated suggested edits, according to an illustrative embodiment.
Figure 5:
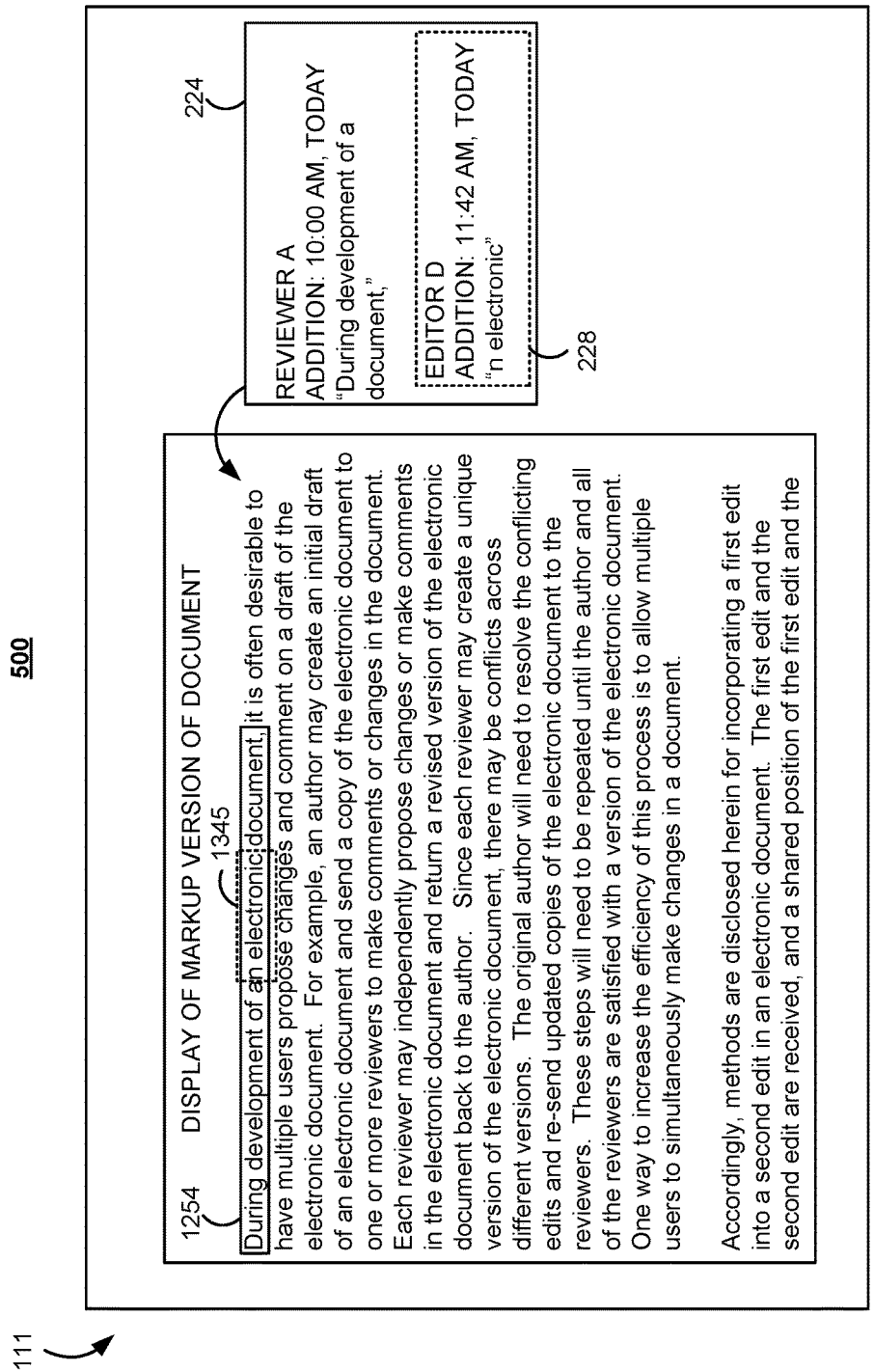
Figure 8:
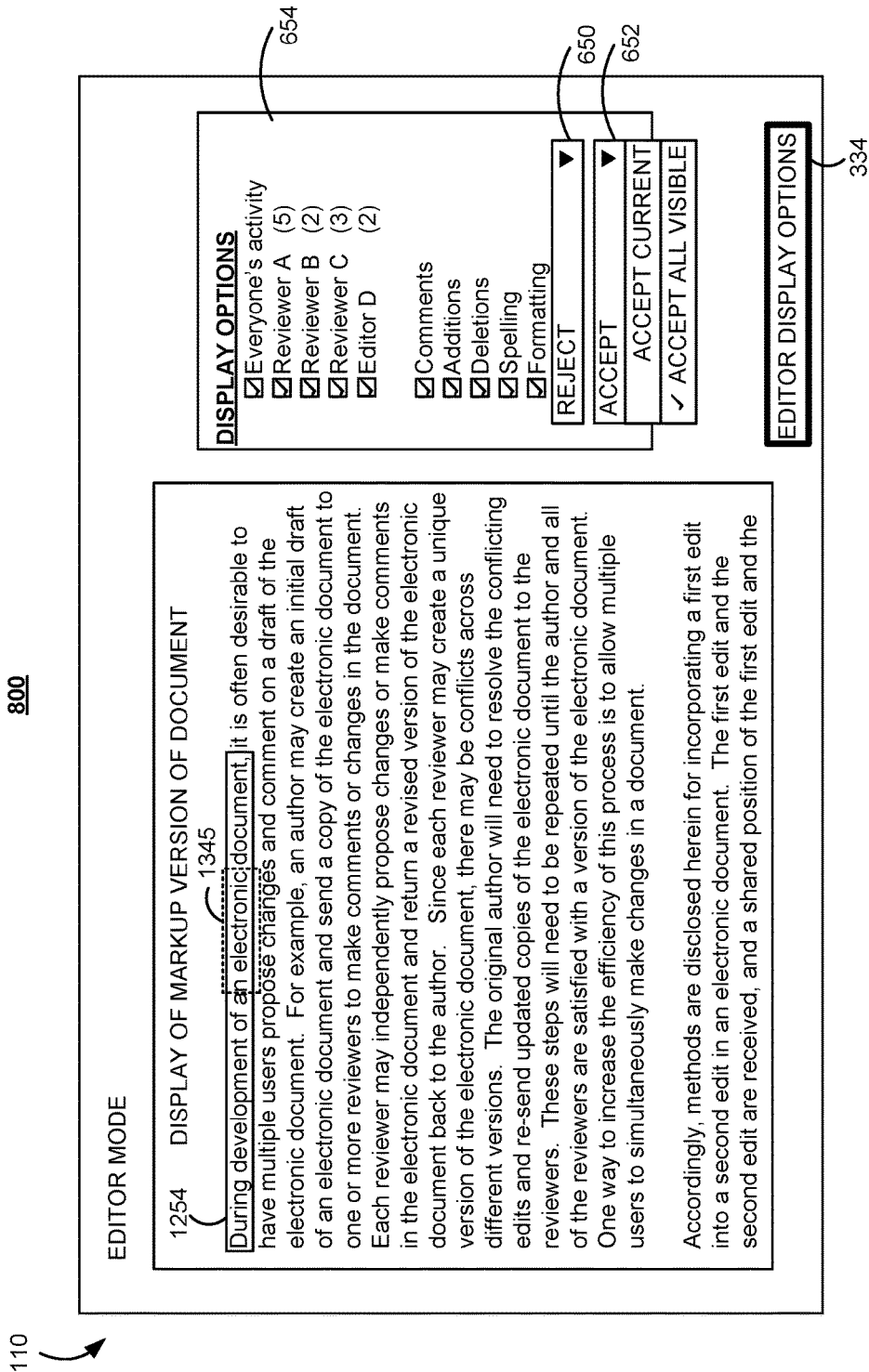
FIG. 8 is a diagram of an exemplary display of an editor interface for displaying a subset of suggested edits in a document, according to an illustrative embodiment.

FIGS. 4-8 are diagrams of exemplary displays of a user interface for users interacting with the master document 106. In particular, FIGS. 4 and 5 are exemplary displays of a user interface that show an editor's change incorporated with a reviewer's change. FIGS. 6 and 7 are exemplary displays of an editor interface 110 that show an editor's options regarding the reviewer's change. FIG. 8 is an exemplary display of an editor interface 110 including a set of editor display options.

FIGS. 4 and 5 are exemplary diagrams 400 and 500, respectively, of a display of a user interface 111 for a user interacting with the master document 106, according to an illustrative embodiment. In particular, the user interface may be a reviewer interface 114 for a reviewer 112 or an editor interface 110 for an editor 108. The display of the user interface 111 may be updated in real time such that the user is informed in real time of changes (i.e., in the form of suggested edits or comments) of the document 106 made by other users. In this way, the user may make his/her own informed changes of the document 106 in view of the latest suggestions made by all the other collaborators on the document 106. Therefore, the systems and methods described herein promote efficient collaboration for editing a document 106.

The diagram 400 includes a portion of an original document 106 with a suggested edit 1254. In particular, the suggested edit 1254 includes the addition of a portion of a sentence to the document and is distinguished from a remainder of the document by a box surrounding the text. In addition, the diagram 400 includes a sidebar on the right hand side of the user interface 111 for displaying metadata associated with the suggested edit 1254. In particular, the sidebar includes a metadata region 224 associated with the suggested edit 1254. The metadata region 224 includes data indicative of which user made the suggested edit 1254 (i.e., Reviewer A), the edit type corresponding to the suggested edit 1254 (i.e., an addition), the time and date the suggested edit was made (i.e., 10:00 AM today), and an indication of the object to be added (i.e., "During development of a document."). Metadata shown in the metadata region 224 may be stored in a data structure such as the data structure 118 shown in FIG. 3.

The diagram 500 is similar to the diagram 400, except that the diagram 500 further includes another suggested edit 1345. The suggested edit 1345 includes the addition of a phrase "n electronic" to the portion added by the suggested edit 1254. In addition, the sidebar on the right hand side of the reviewer interface 114 includes another metadata region 228 associated with the suggested edit 1345. The metadata region 228 indicates that the suggested edit 1345 includes the addition of a phrase "n electronic" and was made by Editor D. The metadata region 228 further includes an indication of the date and time that Editor D made the suggested edit 1345. The suggested edit 1345 is distinguished from a remainder of the document by a box with dotted lines surrounding the text. As an indication that the metadata region 228 corresponds to the suggested edit 1345, the metadata region 228 is also surrounded by a box with dotted lines. Metadata shown in the metadata region 228 may be stored in a data structure such as the data structure 118 shown in FIG. 3.

When Editor D makes the suggested edit 1345, the review manager 102 determines that the suggested edit 1345 depends on (or equivalently, has a compounding relationship with) the suggested edit 1254. In particular, the review manager 102 determines that acceptance of the suggested edit 1345 depends on the acceptance of the suggested edit 1254. The review manager 102 further determines that the suggested edit 1254 was made by a reviewer and the suggested edit 1345 was made by an editor, who has greater privileges with respect to the document 106 than the reviewer. Upon determining that the suggested edits have a compounding relationship and that the user who made the later suggested edit has greater privileges than the user who made the earlier suggested edit, the review manager 102 incorporates the later edit with the earlier edit. This is shown in the user interface 111 by the inclusion of the metadata region 228 within the metadata region 224. Thus, the suggested edit 1345 is incorporated into the suggested edit 1254, and the sidebar region of FIG. 5 displays an annotation of the incorporation.

When Reviewer A makes the suggested edit 1254 and when Editor D makes the suggested edit 1345, the review manager 102 may receive data indicative of the suggested edits 1254 and 1345 over the network 101 and may accordingly update the list of suggestions 105. Furthermore, the data structure 118 shown in FIG. 3 may also be updated as new suggested edits are received over the network 101.

The diagrams 400 and 500 are exemplary displays and are shown for illustrative purposes only. In particular, one of ordinary skill in the art will appreciate any combination of metadata associated with suggested edits may be displayed in any number of ways on the reviewer interface 114. For example, the metadata regions 224 and 228 may include only a portion of the text to be added. When a reviewer selects, via user input (such as with a mouse click or with keyboard input), a region surrounding a suggested edit 1254 or 1345 or a metadata region 224 or 228, the selected metadata region and/or the suggested edit may be highlighted with color or distinguished in any other way from a remainder of the document 106. The diagrams 400 and 500 show that the suggested edits 1254 and 1345 are distinguished from a remainder of the document by boxes surrounding the text. However, any method of distinguishing suggested edits such as 1254 and 1345 from a remainder of the document 106 may be used, including using different colors for different reviewers, different colors for different types of edits, underlining added items, striking out removed items, redlining the view of the document, or any other suitable method of distinguishing suggested edits in a document.

FIGS. 6 and 7 are exemplary diagrams 600 and 700, respectively, of an editor interface 110 while an editor 108 interacts with the document 106, according to an illustrative embodiment. In particular, the diagram 600 is an example display of the editor interface 110 when the editor 108 is prompted to accept or reject the suggested edit 1254, and the diagram 700 is an example display of the editor interface 110 when the editor 108 selects to reject the suggested edit 1254. In the diagrams 600 and 700, the editor 108 is not prompted to accept or reject the suggested edit 1345 because the suggested edit 1345 has been incorporated into the suggested edit 1254, as described in relation to FIG. 5. Because the suggested edit 1345 has been incorporated into the suggested edit 1254, acceptance or rejection of the suggested edit 1254 automatically causes an acceptance or rejection, respectively, of the suggested edit 1345.

The diagram 600 for the editor 108 includes a similar view as in diagram 500 for another user (such as a reviewer), with the exception that the diagram 600 includes several additional options. In particular, the diagram 600 includes an editor display options button 334 (described in more detail in relation to FIG. 8) and decision box 330. The decision box 330 corresponds to the suggested edit 1254 and is a prompt for the editor 108 to make a selection to accept or reject the corresponding suggested edit. When the editor 108 provides a user input (in the form of selecting one of the options in the decision box 330), the display of the mark-up version of the document will be updated to reflect the selection made by the editor 108. Because the suggested edit 1345 is incorporated with the suggested edit 1254, acceptance of the suggested edit 1254 results in automatic acceptance of the suggested edit 1345, and rejection of the suggested edit 1254 results in automatic rejection of the suggested edit 1345.

As an example, the diagram 700 is a view of the display of the editor interface 110 when the editor 108 has rejected the suggested edit 1254 by providing user input to the decision box 330. In this case, because the suggested edit 1345 is incorporated with the suggested edit 1254 (meaning that acceptance of suggested edit 1345 requires acceptance of the suggested edit 1254), the review manager 102 therefore automatically rejects the suggested edit 1345 in response to receiving a rejection of the suggested edit 1254 from the editor 108. In an example, the review manager 102 determines that the suggested edit 1345 is incorporated with the suggested edit 1254 by referring to the data structure 118, or using any other suitable method for identifying an incorporation of one edit with another edit.

When the editor 108 selects to accept or reject the suggested edit 1254, the status of the suggested edit 1254 is updated. To update the status of the suggested edit 1254, the review manager 102 may update an entry indicative of the status of the suggested edit 1254 in a data structure such as the data structure 118. Examples of statuses for suggested edits include pending (i.e., if the editor 108 has not yet selected to accept or reject the suggested edit), accepted (i.e., if the editor 108 accepts the suggested edit), or rejected (i.e., if the editor 108 rejects the suggested edit). In this case, the status of the suggested edit 1254 would be updated from pending to accepted upon receiving the acceptance from the editor 108, or from pending to rejected upon receiving the rejection from the editor 108, as shown in FIG. 7. Furthermore, an update in the status to the suggested edit 1254 requires updates to the status of the suggested edit 1354. In this case, updates to the status of the suggested edit 1254 may also require updates to the data entry corresponding to the suggested edit 1354 in the data structure 118. In addition, an indication of the identification of an editor 108 who accepted or rejected a suggested edit may be saved in a data structure such as the data structure 118. Then, when other editors view the document 106 or a history of the document 106, the identification of the editor 108 who made changes to the document 106 may be determined.

In addition, when the editor 108 accepts or rejects the suggested edit 1254, the view of the document is also updated. In particular, the boxes surrounding the suggested edits 1254 and 1345 are removed from the diagram 700 to indicate that the editor 108 has accepted or rejected the suggested edit 1254. Furthermore, the decision box 330 may include an indication that the suggested edit 1345 (corresponding to metadata region 228) has also been automatically accepted or rejected (not shown). The update to the view of the document 106 may be displayed in real time to any user viewing the document. In certain implementations, upon receiving an acceptance or a rejection of a suggested edit from the editor 108, the metadata regions corresponding to the affected suggested edit(s) are removed from the sidebar. In other implementations, the user interacting with the document 106 may be shown an indication that the suggested edit(s) have been accepted or rejected in the sidebar. The indication may correspond to a compressed version of the metadata region, an icon, or any other suitable indication.

As shown in FIG. 7, as a result of the rejection of the suggested edit 1254, the portion that Reviewer A added is removed from the display of the master document 106. Alternatively, if the suggested edit 1254 were accepted, the box surrounding the sentence (shown in FIG. 6, indicating that the suggested edit 1254 was previously pending) is removed. Removal of the box surrounding the added portion is indicative that the addition has been accepted by an editor 108.

In certain implementations, the review manager 102 is configured to allow an editor 108 to undo a previous acceptance or rejection of a suggested edit. For example, the editor 108 may reject the suggested edit 1254. In this case, the review manager 102 automatically rejects any privileged edits that were part of the suggested edit 1254. In the example shown, because the suggested edit 1345 is an editor's modification of a reviewer's suggested edit 1254, the suggested edit 1345 is a privileged edit and has therefore been incorporated into the suggested edit 1254. In other words, privileged edits are treated as part of the suggested edit that they modify. Thus, because rejection of the suggested edit 1254 requires rejection of the suggested edit 1345, the suggested edit 1345 is rejected when the suggested edit 1254 is rejected. However, even after the suggested edit 1254 is rejected by the editor 108, an indication of the suggested edit 1254 may still be displayed to the editor 108 over the editor interface 110. For example, the indication may be an icon in the sidebar of the editor interface 110, and the editor 108 may select to view the rejected suggested edit 1254 by hovering over the icon or providing user input such as a mouse click, for example. While viewing the rejected suggested edit 1254, the editor 108 may select to accept the suggested edit 1254, effectively undoing the rejection of the suggested edit 1254 (and the privileged edit 1345). Alternatively, the editor 108 may confirm rejection of the suggested edit 1254, and the corresponding icon may be removed from the sidebar. Similarly, the editor 108 may undo previous acceptances of suggested edits. Furthermore, the review manager 102 allows the editor 108 to undo previous acceptances or rejections of suggested edits. This feature is useful when it is desirable to allow the editor 108 to review previous decisions made by another editor or to review previous decisions by the same editor 108, in case the editor 108 changes his/her mind. In certain implementations, multiple editors 108 collaborate to make changes in a document 106. In this case, this feature would enable an editor 108 to undo previous acceptances or rejections made by another editor.

FIG. 8 is an illustrative diagram 800 of a view of the editor interface 110 when an editor 108 interacts with the document 106, according to an illustrative embodiment. In particular, in the diagram 800, the editor 108 has selected to display the editor display options by selecting the editor display options button 334. When the editor display options button 334 is selected, the sidebar of the editor interface 110 includes a display box 654. In particular, the display box 654 includes a list of display options, and decision options (i.e., reject options 650 and accept options 652) for the editor 108.

In particular, the display box 654 allows the editor 108 to selectively view a subset of all the suggested edits related to the document 106. For example, the editor 108 may wish to view only the suggested edits corresponding to a particular reviewer, or corresponding to a particular type of suggested edit. In this case, the editor 108 would select and deselect the appropriate set of options under the display options in the display box 654. When the editor 108 selects and deselects the display options, the view of the display of the document may be updated in real time. As shown, the editor 108 has selected to view the option corresponding to everyone's activity. Upon selecting this option, each box next to a reviewer or editor's identifier (i.e., Reviewer A, Reviewer B, Reviewer C, and Editor D) may be automatically selected, and all the suggested edits may be shown in the display. The numbers following the user identifiers correspond to a number of pending suggestions remaining from the reviewer. For example, Reviewer A has five pending suggested edits, Reviewer B has two pending suggested edits, Reviewer C has three pending suggested edits, and Editor D has two pending suggested edits. The review manager 102 may appropriately update these numbers as the editor 108 accepts or rejects the suggested edits in the document 106.

The display box 654 also allows the editor 108 to selectively view a subset of the suggested edits corresponding to an edit type. The editor 108 may select and deselect the appropriate set of options to display the edits corresponding to one or more desired edit types. As shown, the editor 108 has selected to view all edits, corresponding to comments, additions, deletions, spelling mistakes, and formatting changes. In this case, all the edits, regardless of edit type are shown in the display. The review manager may use the data structure shown in FIG. 3 to easily determine the subset of suggested edits to display in the view of the document.

In an example, the editor 108 may wish to view only those suggested edits corresponding to Reviewer A. To only display the suggested made by Reviewer A, the editor 108 may deselect all reviewers under the display options in the display box 654 except for Reviewer A. However, one of the suggested edits made by Reviewer A (i.e., suggested edit 1254) includes a suggested edit made by Editor D (i.e., suggested edit 1354). In some implementations, the review manager 102 may prompt the editor 108 to determine whether or not to display any suggested edits that are incorporated with suggested edits made by Reviewer A. Depending on the input from the editor 108, the review manager 102 may display both suggested edits 1254 and 1345, or neither suggested edit may be displayed. In some implementations, the review manager 102 automatically considers any incorporated (or privileged) edits (made by an editor 108) that modify a reviewer's original suggested edit as part of the original suggested edit. In this case, when the editor 108 deselects all reviewers except for Reviewer A, neither of the suggested edits 1254 and 1345 are displayed. However, if Reviewer A is selected, then both suggested edits 1254 and 1345 are displayed. Furthermore, even if Reviewer A is selected and Editor D is deselected, both suggested edits 1254 and 1345 are still displayed because the suggested edit 1345 is integral to the suggested edit 1254. Thus, any decision regarding the suggested edit 1254 will also automatically apply to the suggested edit 1345.

In addition, the display box 654 includes two options corresponding to reject options 650 and accept options 652. The options 650 and 652 allow the editor 108 to accept or reject a current edit, which may correspond to a suggested edit in the document 106 and may be highlighted in the document with color, a pointer, or any other suitable way of pointing out an edit in a document. In addition, the options 650 and 652 also allow the editor 108 to accept or reject all visible edits (i.e., corresponding to those edits selected to be displayed under the display options). In particular, it may be desirable for the editor 108 to accept or reject all suggested edits corresponding to a particular reviewer (i.e., Reviewer A). In this case, the editor 108 may select to display only those edits corresponding to Reviewer A, and may select the option 650 to reject all the displayed suggested edits. Alternatively, the editor 108 may select the option 652 to accept all the suggested edits from Reviewer A. As an example, this may be desirable if the editor 108 has enough trust in Reviewer A to accept all of the suggestions made by Reviewer A without reviewing them individually.

It may be desirable for the editor 108 to accept or reject all suggested edits corresponding to a particular edit type. In particular, parsing through each suggested edit may be time consuming, especially when the suggested edits include fixes to spelling mistakes, format changes, or any other minor suggested edits. Thus, the editor 108 may select to display only those edits corresponding to one or more edit types (i.e., spelling mistakes and formatting changes, or the "non-substantive" suggested edits), and select the option 652 to accept all visible edits. Then, the editor 108 may parse through the remainder of the edits (i.e., the "substantive" suggested edits) for individual consideration. These options, which allow the editor 108 to efficiently accept or reject edits corresponding to one or more reviewers or one or more edit types, allow for changes to be made to the document 106 efficiently.

The display box 654 is shown for illustrative purposes only, and one of ordinary skill in the art will appreciate that any subset of the components shown may be combined with any other sort of data related to the document 106 for display.

Figure 9:
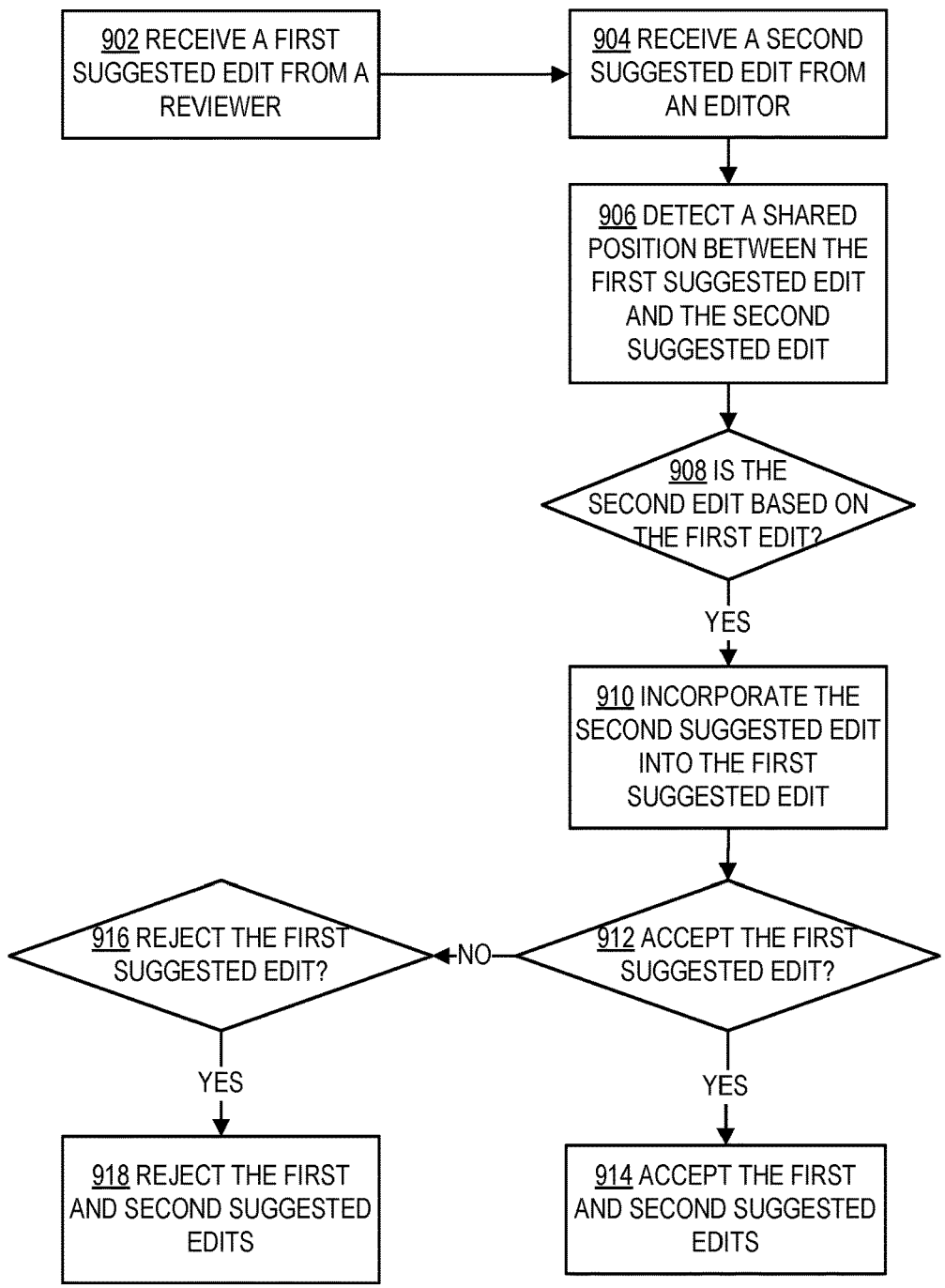
FIG. 9 is a flowchart of a method used by the review manager to manage updates to a document, according to an illustrative embodiment.

FIG. 9 is an illustrative flow diagram of a method 900 used by the review manager 102 to manage updates to a document 106. The method 900 includes the steps of receiving a first suggested edit from a reviewer (step 902) and receiving a second suggested edit from an editor (step 904). The review manager 102 detects a shared position between the first suggested edit and the second suggested edit (step 906). If the second edit is based on the first edit (decision block 908), then the review manager 102 incorporates the second edit into the first edit (step 910). If the review manager 102 receives an indication that the first suggested edit is accepted (decision block 912), then both the first and the second suggested edits are accepted (step 914). Otherwise, if the review manager 102 receives an indication that the first suggested edit is rejected (decision block 916), then both the first and the second suggested edits are rejected (step 918).

At step 902, the review manager 102 receives a first suggested edit from a reviewer, and at step 904, the review manager 102 receives a second suggested edit from an editor reviewer. The reviewer who provides the first suggested edit is a user who is associated with a reviewer set of privileges with respect to the document 106. In particular, the set of reviewer privileges includes read capabilities, in addition to being able to provide comments and/or suggested edits to the document 106. The editor who provides the second suggested edit is a user who is associated with a set of editor privileges with respect to the document 106. In particular, the set of editor privileges includes read and write capabilities, in addition to being able to consider or delete comments that are provided by a reviewer. Furthermore, the set of editor privileges also includes being able to accept or reject suggested edits provided by a reviewer. In some implementations, an editor may select to operate in a reviewer mode, during which the editor can provide comments and/or suggested edits. In this case, an editor may provide the first suggested edit when operating in the reviewer mode, and another editor (or even the same editor who provided the first suggested edit) may provide the second suggested edit.

At step 906, the review manager 102 detects a shared position between the first suggested edit and the second suggested edit. The shared position includes a same portion of the document 106 to which both suggested edits suggest making a change. For example, the first and second edits may correspond to the suggested edits 1254 and 1345, respectively, as shown in FIG. 5. In this case, the review manager 102 may identify the shared position to be the region of the document where the text of edit 1254 is suggested to be inserted (i.e., before "it is often desirable to . . . ").

At decision block 908, the review manager 102 determines whether the second suggested edit is based on the first suggested edit. Because both edits include a suggested change of the document in the shared position, the shared position is indicative of a relationship between the edits. In particular, after identifying the shared position of the first edit (i.e., the suggested edit 1254) and the second edit (i.e., the suggested edit 1345), the review manager 102 determines that the first and second edits have a compounding relationship. In the example shown in FIG. 5, when the document 106 is a text document, the first suggested edit corresponds to an insertion of a portion of text into the document 106, while the second suggested edit corresponds to an edit of the inserted text. In this case, the second suggested edit compounds with the first suggested edit because acceptance of the second suggested edit would require acceptance of the first suggested edit. The compounding relationship may therefore be determined based on the shared position. In general, the review manager 102 may use any type of information related to the document 106 to determine that the second suggested edit is based on the first suggested edit.

If the second suggested edit is based on the first suggested edit, method 900 proceeds to step 910, at which the review manager 102 incorporates the second suggested edit into the first suggested edit. Incorporating the second suggested edit into the first suggested edit essentially combines the suggested edits such that the first suggested edit subsumes the second suggested edit. As an example, to incorporate one edit into another edit, the review manager 102 may update a data structure such as the data structure 118 shown in FIG. 2. In particular, the review manager 102 may recognize that the suggested edit 1345 (made by an editor) depends on the suggested edit 1254 (made by a reviewer). Upon recognizing this type of dependency, the review manager 102 may update a field entry in the data structure 118 to indicate that the suggested edit 1345 is incorporated into the suggested edit 1254 (not shown).

In another example, a user interface may also include an indication of an incorporation of one suggested edit into another suggested edit. The user interfaces in FIGS. 5-7 show the inclusion of the metadata region 228 (corresponding to the suggested edit 1345, or the second suggested edit) within the metadata region 224 (corresponding to the suggested edit 1254, or the first suggested edit). The sidebar regions of FIGS. 5-7 therefore display an annotation of the incorporation. Furthermore, as shown in FIGS. 6 and 7, an editor 108 may not have the option of accepting or rejecting the second suggested edit (i.e., the suggested edit 1345) because it has been incorporated into the first suggested edit (i.e., the suggested edit 1254). Instead, the editor 108 only has the option of accepting or rejecting the first suggested edit, which would in turn cause the automatic acceptance or rejection of the second suggested edit. In general, any other type of annotation may be displayed over a user interface to indicate the incorporation of one edit with another edit.

After the review manager 102 incorporates the second suggested edit into the first suggested edit, the review manager 102 determines whether to accept the first suggested edit at decision block 912. In particular, if the review manager 102 determines that the first suggested edit should be accepted (by direct user input from an editor 108, for example), the review manager 102 proceeds to step 914 to accept both the first and second suggested edits. Because the second suggested edit has been incorporated into the first suggested edit, acceptance of the first suggested edit requires acceptance of the second suggested edit, and both suggested edits are accepted at step 914.

Accepting an edit includes updating a view of the document 106 to reflect the acceptance. For example, when the edits were pending, the view of the document 106 may have included a markup of the document indicating the suggested edit (i.e., suggested additions may be underlined, suggested deletions may be crossed out, etc.). Upon acceptance of the first suggested edit, the markup of the first suggested edit (and any incorporated suggested edits, such as the second suggested edit) may be removed from the display. Furthermore, a data structure storing data related to the first suggested edit may be updated to reflect the acceptance. In particular, the data structure may have a field entry for a status of the first suggested edit, and the status may be updated from pending to accepted. Furthermore, a published version of the document 106 may be visible to a third type of user, which may be referred to as a viewer. Viewers of a document 106 may be associated with a set of viewer privileges that include permission to view a published version of the document 106. Any pending suggested edits may be hidden from the view of the published version of the document 106, but once a pending edit is accepted by an editor 108, the published version of the document 106 may be updated with the newly accepted change.

Alternatively, if the review manager 102 determines that the first suggested edit should be rejected at decision block 916, the review manager 102 rejects both the first and the second suggested edits at step 918. Because the second suggested edit is incorporated into the first suggested edit, the second suggested edit may not be accepted without acceptance of the first suggested edit. Thus, when the first suggested edit is rejected (by direct input from an editor 108, for example), the second suggested edit is also rejected. In some implementations, the review manager 102, upon determining that the first suggested edit is not accepted at decision block 912, thereby determines that the first suggested edit is rejected. In this case, the review manager 102 may proceed directly to step 918 to reject both the first and the second suggested edits.

Figure 10:
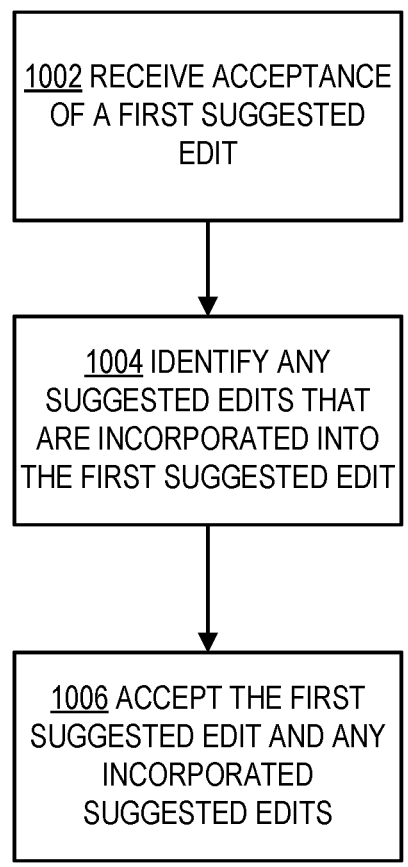
FIG. 10 is a flowchart of a method used by the review manager to manage accepted changes to a document, according to an illustrative embodiment.

The order of the steps and decision blocks as shown in FIG. 9 are for illustrative purposes only and one of ordinary skill in the art will understand that any suitable order may be used. In particular, as shown as depicted in FIG. 9, the review manager 102 first incorporates the second suggested edit into the first suggested edit at step 910 before determining whether to accept or reject the first suggested edit. However, as shown in FIG. 10, the review manager 102 may determine whether to accept or reject the first suggested edit before determining whether any other suggested edit is incorporated into the first suggested edit. After receiving an acceptance or rejection of the first suggested edit, the review manager 102 may determine whether there are any other suggested edits that are incorporated into the first suggested edit. Any incorporated suggested edits may then be accordingly accepted or rejected.

FIG. 10 is a flowchart of a method 1000 used by the review manager to manage accepted changes to a document, according to an illustrative embodiment. The method 1000 includes the steps of receiving an acceptance of a first suggested edit (step 1002), identifying any other suggested edits that are incorporated into the first suggested edit (step 1004), and accepting the first suggested edit and any incorporated suggested edits (step 1006).

At step 1002, the review manager 102 receives an acceptance of a first suggested edit. As described in relation to decision block 912 of the method 900, the review manager 102 may make this determination based on a user input such as an input from an editor 108 indicating to accept the first suggested edit. In another example, the review manager 102 may make this determination based on previously received input from the editor 108 (i.e., by receiving an acceptance of another suggested edit, whose acceptance requires acceptance of the first suggested edit).

At step 1004, the review manager 102 identifies any suggested edits that are incorporated into the first suggested edit. For example, the review manager 102 may parse a data structure such as the data structure 118 to identify any incorporated suggested edits. In particular, the review manager 102 may identify any other suggested edits that were created by an editor that depend on (or are based on, or have a compounding relationship with) the first suggested edit. In another example, the data structure 118 may include a dedicated column that provides data indicative of incorporated suggested edits (not shown).

At step 1006, the review manager 102 accepts the first suggested edit and any incorporated suggested edits that were identified at step 1004. For example, when the first suggested edit (i.e., the suggested edit 1254) is accepted, the review manager 102 determines that a second suggested edit (i.e., the suggested edit 1345) was created by an editor 108 and depends from the first suggested edit. In this case, the second suggested edit is also accepted. As described herein, only one suggested edit is incorporated into another suggested edit. In general, any number of suggested edits may be determined to be incorporated into the first suggested edit, and all of the identified incorporated suggested edits may be automatically accepted (or rejected) upon receiving an acceptance (or rejection) of the first suggested edit.

Figure 11:
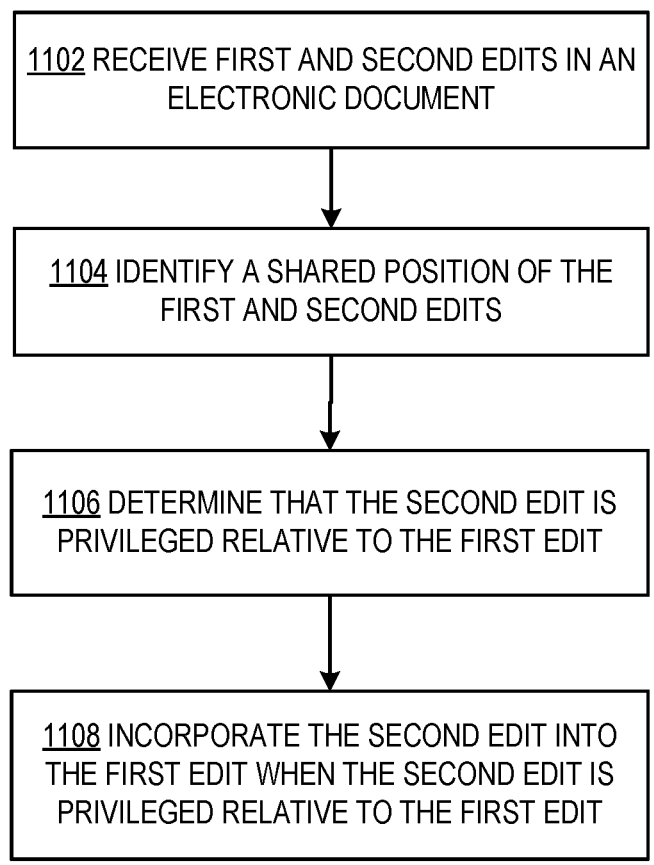
FIG. 11 is a flowchart of a method used by the review manager to incorporate a suggested edit into another suggested edit, according to an illustrative embodiment.

FIG. 11 is a flowchart of a method 1100 used by the review manager to incorporate a suggested edit into another suggested edit, according to an illustrative embodiment. The method 1100 includes the steps of receiving first and second edits in an electronic document (step 1102), identifying a shared position of the first and second edits (step 1104), determining that the second edit is privileged relative to the first edit (step 1106), and incorporating the second edit into the first edit when the second edit is privileged relative to the first edit (step 1108).

At step 1102, the review manager 102 receives a first edit and a second edit in an electronic document. As described above, the first edit and the second edit may be suggested edits that are created by a reviewer 112 or an editor 108. In particular, a reviewer 112 may create the first edit, and an editor 108 may create the second edit. Because the edits are suggested edits, a status of the edits is pending until either or both of the edits are accepted or rejected by an editor 108.

At step 1104, the review manager 102 identifies a shared position between the first edit and the second edit. The shared position includes a same portion of the document 106 to which both suggested edits suggest making a change. For example, the first and second edits may correspond to the suggested edits 1254 and 1345, respectively, as shown in FIG. 5. In this case, the review manager 102 may identify the shared position to be the region of the document where the text of edit 1254 is suggested to be inserted (i.e., before "it is often desirable to . . . ").

At step 1106, the review manager 102 determines that the second edit is privileged relative to the first edit. In particular, the review manager 102 may determine that the first edit was made by a first user with a first set of permissions and the second edit is made by a second user with a second set of permissions larger than the first set of permissions. In particular, the first user may be a reviewer 112 (or an editor 108 operating in reviewer mode, as described above) with reviewer privileges. The reviewer privileges include the ability to read, comment on, and make suggested to the electronic document 106. The second user may be an editor 108 with editor privileges. The editor privileges include the ability to read, write, and accept or rejected suggested changes to the electronic document 106. In addition, the editor privileges further include the ability to make changes to any suggested changes made by a reviewer 112.

At step 1108, the review manager 102 incorporates the second edit into the first edit when the second edit is privileged relative to the first edit. As described above, incorporating the second edit into the first edit essentially combines the edits such that the first edit subsumes the second edit. Thus, the changes that an editor 108 makes to a suggested change made by a reviewer 112 are automatically incorporated into the suggested change made by the reviewer. Incorporation of the editor 108's changes means that acceptance or rejection of the reviewer's suggested change causes the automatic acceptance or rejection of the incorporated changes.

As an example, to incorporate one edit into another edit, the review manager 102 may update a data structure such as the data structure 118 shown in FIG. 2. In particular, the review manager 102 may recognize that the suggested edit 1345 (made by an editor) depends on the suggested edit 1254 (made by a reviewer). Upon recognizing this type of dependency, the review manager 102 may update a field entry in the data structure 118 to indicate that the suggested edit 1345 is incorporated into the suggested edit 1254 (not shown). In another example, the data structure may be updated to reflect the incorporation. For example, the row corresponding to the suggested edit 1345 may be deleted, and the row corresponding to the suggested edit 1254 may be updated to include an indication of the suggested edit 1345. In another example, as shown in FIGS. 5-7, a user interface may also include an indication of an incorporation of one suggested edit into another suggested edit by including the metadata region 228 (corresponding to one suggested edit) within the metadata region 224 (corresponding to another suggested edit).

Figure 12:
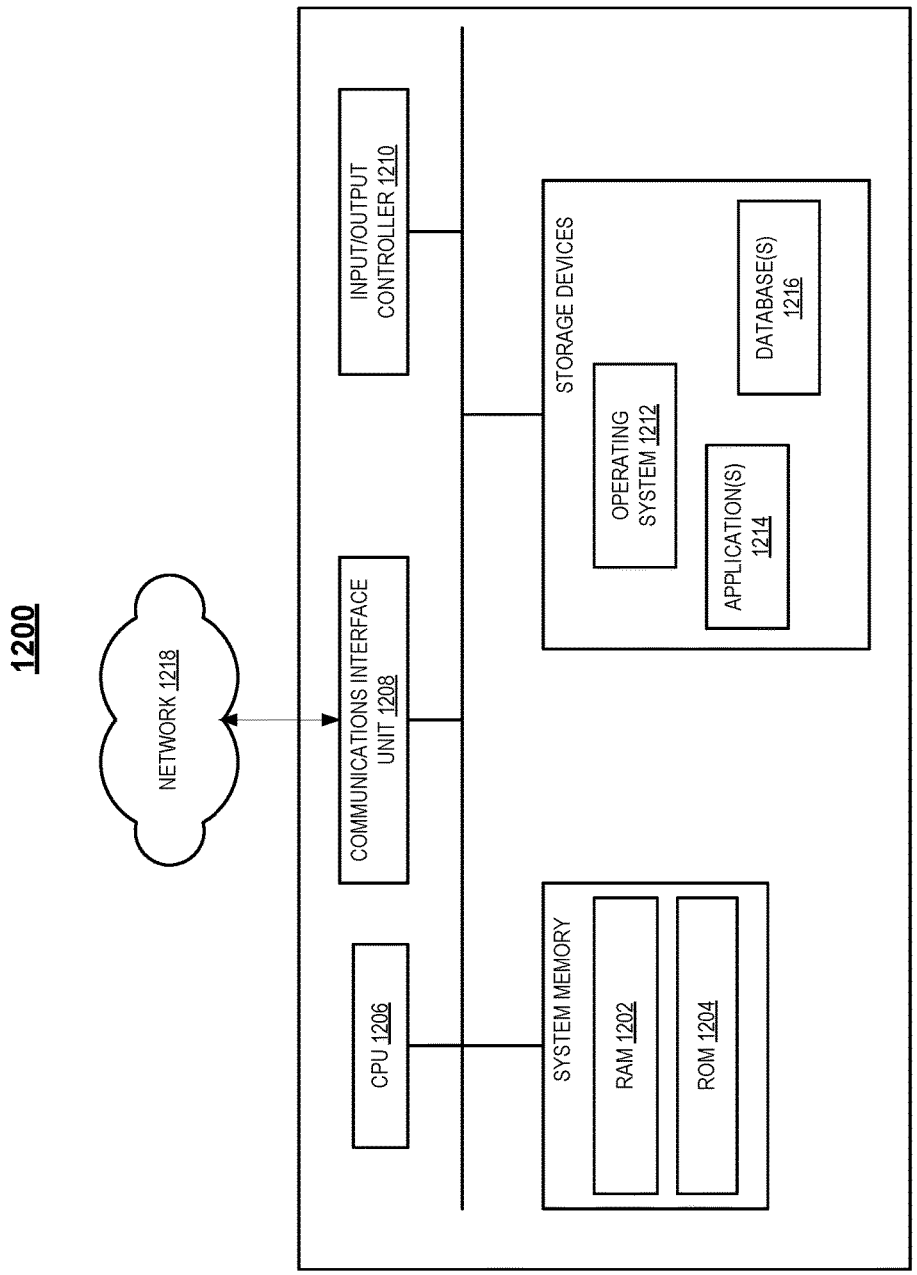
FIG. 12 is a block diagram of a computing device for performing any of the processes described herein, according to an illustrative embodiment.

FIG. 12 is a block diagram of a computing device, such as any of the components of the system of FIG. 1, for performing any of the processes described herein. Each of the components of these systems may be implemented on one or more computing devices 1200. In certain aspects, a plurality of the components of these systems may be included within one computing device 1200. In certain implementations, a component and a storage device may be implemented across several computing devices 1200.

The computing device 1200 comprises at least one communications interface unit, an input/output controller 1210, system memory, and one or more data storage devices. The system memory includes at least one random access memory (RAM 1202) and at least one read-only memory (ROM 1204). All of these elements are in communication with a central processing unit (CPU 1206) to facilitate the operation of the computing device 1200. The computing device 1200 may be configured in many different ways. For example, the computing device 1200 may be a conventional standalone computer or alternatively, the functions of computing device 1200 may be distributed across multiple computer systems and architectures. In FIG. 12, the computing device 1200 is linked, via network or local network, to other servers or systems.

The computing device 1200 may be configured in a distributed architecture, wherein databases and processors are housed in separate units or locations. Some units perform primary processing functions and contain at a minimum a general controller or a processor and a system memory. In distributed architecture implementations, each of these units may be attached via the communications interface unit 1208 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 1206 comprises a processor, such as one or more conventional microprocessors and one or more supplementary co-processors such as math co-processors for offloading workload from the CPU 1206. The CPU 1206 is in communication with the communications interface unit 1208 and the input/output controller 1210, through which the CPU 1206 communicates with other devices such as other servers, user terminals, or devices. The communications interface unit 1208 and the input/output controller 1210 may include multiple communication channels for simultaneous communication with, for example, other processors, servers or client terminals.

The CPU 1206 is also in communication with the data storage device. The data storage device may comprise an appropriate combination of magnetic, optical or semiconductor memory, and may include, for example, RAM 1202, ROM 1204, flash drive, an optical disc such as a compact disc or a hard disk or drive. The CPU 1206 and the data storage device each may be, for example, located entirely within a single computer or other computing device; or connected to each other by a communication medium, such as a USB port, serial port cable, a coaxial cable, an Ethernet cable, a telephone line, a radio frequency transceiver or other similar wireless or wired medium or combination of the foregoing. For example, the CPU 1206 may be connected to the data storage device via the communications interface unit 1208. The CPU 1206 may be configured to perform one or more particular processing functions.

The data storage device may store, for example, (i) an operating system 1212 for the computing device 1200; (ii) one or more applications 1214 (e.g., computer program code or a computer program product) adapted to direct the CPU 1206 in accordance with the systems and methods described here, and particularly in accordance with the processes described in detail with regard to the CPU 1206; or (iii) database(s) 1216 adapted to store information that may be utilized to store information required by the program.

The operating system 1212 and applications 1214 may be stored, for example, in a compressed, an uncompiled and an encrypted format, and may include computer program code. The instructions of the program may be read into a main memory of the processor from a computer-readable medium other than the data storage device, such as from the ROM 1204 or from the RAM 1202. While execution of sequences of instructions in the program causes the CPU 1206 to perform the process steps described herein, hard-wired circuitry may be used in place of, or in combination with, software instructions for implementation of the processes of the present disclosure. Thus, the systems and methods described are not limited to any specific combination of hardware and software.

Suitable computer program code may be provided for performing one or more functions in relation to incorporating one suggested edit into another suggested edit as described herein. The program also may include program elements such as an operating system 1212, a database management system and "device drivers" that allow the processor to interface with computer peripheral devices (e.g., a video display, a keyboard, a computer mouse, etc.) via the input/output controller 1210.

The term "computer-readable medium" as used herein refers to any non-transitory medium that provides or participates in providing instructions to the processor of the computing device 1200 (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 1206 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device 1200 (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

What is claimed is:

1. A method for presenting an incorporation of a second edit into a first edit in an electronic document, comprising:

presenting, by a processor, the first edit and the second edit in the electronic document, the first edit and the second edit representing concurrent updates to the electronic document by multiple users comprising a first user and a second user and having different privilege levels, the first edit and the second edit having a shared position in the electronic document;

presenting, by the processor, one or more first graphical elements allowing the second user to select to accept or reject the first edit made by the first user;

presenting, based on respective privilege levels, the shared position, a selection of the second user to accept or reject the first edit made by the first user, the incorporation of the second edit into the first edit, and a second graphical element allowing the second user to view a plurality of display options for the electronic document with the second edit incorporated into the first edit; and in response to a selection of the second graphical element by the second user, presenting the plurality of display options for the electronic document with the second edit incorporated into the first edit, the plurality of display options comprising:
(a) a first set of display options that identify a plurality of users that made a plurality of edits to the electronic document, wherein the first set of display options allows the second user to select any of the identified users to focus on edits made by the selected users,
(b) a second set of display options that identify a plurality of types of edits by the plurality of users, wherein the second set of display options allows the second user to select any of the identified types of edits to focus on edits of the selected types of edits, and
(c) a third set of display options allowing the second user to accept or reject the edits made by the selected users or the edits of the selected types of edits.

2. The method of claim 1, wherein the first user has reviewer privileges associated with the electronic document and the second user has editor privileges associated with the electronic document.

3. The method of claim 1, further comprising annotating a stored version of the first edit with an indication of the second edit.

4. The method of claim 1, further comprising accepting the second edit in response to receiving an acceptance of the first edit by the second user.

5. The method of claim 1, further comprising rejecting the second edit in response to receiving a rejection of the first edit by the second user.

6. The method of claim 1, further comprising hiding the first edit and the second edit from a view of a published version of the electronic document until the first edit is accepted by an editor of the electronic document.

7. The method of claim 1, wherein both the first user and the second user have editor privileges associated with the electronic document and the first edit is made by the first user while operating in a reviewing mode.

8. The method of claim 1, wherein the first edit comprises an insertion or a modification of an element in the electronic document, and the second edit comprises a modification of the first edit.

9. The method of claim 1, further comprising receiving a third edit in the electronic document, wherein the first edit and the third edit share a position in the electronic document, and incorporating the third edit into the first edit when the third edit is privileged relative to the first edit.

10. A system for incorporating a second edit into a first edit in an electronic document, comprising:
a memory; and
a processor, coupled to the memory, to:
present the first edit and the second edit in the electronic document, the first edit and the second edit representing concurrent updates to the electronic document by multiple users comprising a first user and a second user and having different privilege levels, the first edit and the second edit having a shared position in the electronic document;
present one or more first graphical elements allowing the second user to select to accept or reject the first edit made by the first user;
present, based on respective privilege levels, the shared position, a selection of the second user to accept or reject the first edit made by the first user, the incorporation of the second edit into the first edit, and a second graphical element allowing the second user to view a plurality of display options for the electronic document with the second edit incorporated into the first edit; and
in response to a selection of the second graphical element by the second user, present the plurality of display options for the electronic document with the second edit incorporated into the first edit, the plurality of display options comprising:
(a) a first set of display options that identify a plurality of users that made a plurality of edits to the electronic document, wherein the first set of display options allows the second user to select any of the identified users to focus on edits made by the selected users,
(b) a second set of display options that identify a plurality of types of edits by the plurality of users, wherein the second set of display options allows the second user to select any of the identified types of edits to focus on edits of the selected types of edits, and
(c) a third set of display options allowing the second user to accept or reject the edits made by the selected users or the edits of the selected types of edits.

11. The system of claim 10, wherein the first user has reviewer privileges associated with the electronic document and the second user has editor privileges associated with the electronic document.

12. The system of claim 10, wherein the processor is to incorporate the second edit into the first edit by annotating a stored version of the first edit with an indication of the second edit.

13. The system of claim 10, wherein the processor is to accept the second edit in response to receiving an acceptance of the first edit by the second user.

14. The system of claim 10, wherein the processor is to reject the second edit in response to receiving a rejection of the first edit by the second user.

15. The system of claim 10, wherein the processor is to hide the first edit and the second edit from a view of a published version of the electronic document until the first edit is accepted by an editor of the electronic document.

16. The system of claim 10, wherein both the first user and the second user have editor privileges associated with the electronic document and the first edit is made by the first user while operating in a reviewing mode.

17. The system of claim 10, wherein the first edit comprises an insertion or a modification of an element in the electronic document, and the second edit comprises a modification of the first edit.

18. A non-transitory computer readable medium storing instructions which, when executed by a processor, cause the processor to perform operations to present an incorporation of a second edit into a first edit in an electronic document, the operations comprising:
presenting the first edit and the second edit in the electronic document, the first edit and the second edit representing concurrent updates to the electronic document by multiple users comprising a first user and a second user and having different privilege levels, the first edit and the second edit having a shared position in the electronic document;
presenting one or more first graphical elements allowing the second user to select to accept or reject the first edit made by the first user;
presenting, based on respective privilege levels, the shared position, a selection of the second user to accept or reject the first edit made by the first user, the incorporation of the second edit into the first edit, and a second graphical element allowing the second user to view a plurality of display options for the electronic document with the second edit incorporated into the first edit; and in response to a selection of the second graphical element by the second user, presenting the plurality of display options for the electronic document with the second edit incorporated into the first edit, the plurality of display options comprising:
(a) a first set of display options that identify a plurality of users that made a plurality of edits to the electronic document, wherein the first set of display options allows the second user to select any of the identified users to focus on edits made by the selected users,
(b) a second set of display options that identify a plurality of types of edits by the plurality of users, wherein the second set of display options allows the second user to select any of the identified types of edits to focus on edits of the selected types of edits, and
(c) a third set of display options allowing the second user to accept or reject the edits made by the selected users or the edits of the selected types of edits.

19. The non-transitory computer readable medium of claim 18, wherein the operations further comprise annotating a stored version of the first edit with an indication of the second edit.

20. The non-transitory computer readable medium of claim 18, wherein the operations further comprise hiding the first edit and the second edit from a view of a published version of the electronic document until the first edit is accepted by an editor of the electronic document.

* * * * *